US006963854B1

(12) United States Patent  
Boyd et al.

(10) Patent No.: US 6,963,854 B1
(45) Date of Patent: Nov. 8, 2005

(54) TARGET PRICING SYSTEM

(75) Inventors: Dean Boyd, Cottage Grove, OR (US);
Mike Gordon, San Mateo, CA (US);
Jorgen Andersson, Sunnyvale, CA (US); Chia-Hung Charles Tai, Sunnyvale, CA (US); Feng Yang, Sunnyvale, CA (US); Anupama Kolamala, Mt. View, CA (US); Greg Cook, Mt. View, CA (US); Thomas Guardino, Eugene, OR (US); Mudita Purang, Sunnyvale, CA (US); Prabhakar Krishnamurthy, Pleasanton, CA (US); Mark Cooke, El Granada, CA (US); Ravi Nandiwada, San Jose, CA (US); Brian Monteiro, Sunnyvale, CA (US); Steve Haas, Menlo Park, CA (US)

(73) Assignee: Manugistics, Inc., Rockville, MD (US)

( * ) Notice: Subject to any disclaimer, the term of this patent is extended or adjusted under 35 U.S.C. 154(b) by 0 days.

(21) Appl. No.: 09/517,983

(22) Filed: Mar. 3, 2000

Related U.S. Application Data

(60) Provisional application No. 60/123,345, filed on Mar. 5, 1999, provisional application No. 60/122,958, filed on Mar. 5, 1999, provisional application No. 60/178,501, filed on Jan. 27, 2000.

(51) Int. Cl.[7] .............................................. G09F 17/60
(52) U.S. Cl. .............................. 705/37; 705/1; 705/35; 705/37; 705/400
(58) Field of Search .............................. 705/37, 80, 36, 705/412, 35, 5, 26, 38, 1, 10, 39, 23, 9, 400; 340/825.27, 825.26; 370/313

(56) References Cited

U.S. PATENT DOCUMENTS

| 4,862,357 A | 8/1989 | Ahlstrom et al. ........... 364/407 |
| 5,021,953 A | 6/1991 | Webber et al. .............. 364/407 |

(Continued)

FOREIGN PATENT DOCUMENTS

DE        19623285        12/1997

(Continued)

OTHER PUBLICATIONS

John Sneed, Estimating earnings forecasting models using fundamental analysis: Controlling for difference accross industries American Business Review, Jan. 1999, vol. 17, iss. 1.*

(Continued)

Primary Examiner—Alain L. Bashore
Assistant Examiner—Debra Charles
(74) Attorney, Agent, or Firm—Hogan & Hartson LLP

(57) ABSTRACT

A business process and computer system known as the "Target Pricing System" (TPS) that generates an optimum bid or value for a competitively bid good or service. The system is resident on one or more host processors in connection with one or more data stores, and includes a product model that defines list values for the bid using stored price data and costs the values using stored cost data, a competitor net price model that calculates an equivalent competitor net price for the value, and
     a market response model that calculates the probability of winning with the value as a function of price. The system further preferably includes
an optimization model that computes the target price of an optimal value that maximizes expected contribution for the bid or value. The system alternately further includes a benefits model for calculating the benefits of using target pricing over a pre-existing approach, and strategic objects which each affect the target price.

43 Claims, 6 Drawing Sheets

U.S. PATENT DOCUMENTS

| | | | |
|---|---|---|---|
| 5,189,606 A * | 2/1993 | Burns et al. | 705/10 |
| 5,191,523 A | 3/1993 | Whitesage | 364/407 |
| 5,249,120 A * | 9/1993 | Foley | 705/1 |
| 5,331,546 A | 7/1994 | Webber et al. | 364/407 |
| 5,361,201 A * | 11/1994 | Jost et al. | 705/35 |
| 5,377,095 A * | 12/1994 | Maeda et al. | 705/10 |
| 5,404,291 A | 4/1995 | Kerr et al. | 364/407 |
| 5,546,564 A | 8/1996 | Horie | 395/500 |
| 5,615,109 A * | 3/1997 | Eder | 705/8 |
| 5,652,867 A | 7/1997 | Barlow et al. | 395/500 |
| 5,710,887 A | 1/1998 | Chelliah et al. | |
| 5,754,543 A | 5/1998 | Seid | 370/351 |
| 5,822,736 A | 10/1998 | Hartman et al. | 705/1 |
| 5,832,453 A | 11/1998 | O'Brian | 705/6 |
| 5,918,209 A | 6/1999 | Campbell et al. | 705/5 |
| 5,933,813 A | 8/1999 | Teicher et al. | 705/26 |
| 5,946,661 A | 8/1999 | Rothschild et al. | 705/7 |
| 5,953,707 A * | 9/1999 | Huang et al. | 705/10 |
| 5,960,407 A | 9/1999 | Vivona | |
| 5,966,694 A | 10/1999 | Rothschild et al. | 705/7 |
| 5,974,399 A | 10/1999 | Giuliani et al. | 705/14 |
| 5,974,403 A * | 10/1999 | Takriti et al. | 705/412 |
| 5,987,425 A | 11/1999 | Hartman et al. | 705/20 |
| 6,021,402 A * | 2/2000 | Takriti | 705/412 |
| 6,023,686 A | 2/2000 | Brown | |
| 6,047,274 A * | 4/2000 | Johnson et al. | 705/412 |
| 6,076,071 A | 6/2000 | Freeny, Jr. | 705/26 |
| 6,078,893 A | 6/2000 | Ouimet et al. | 705/10 |
| 6,085,164 A | 7/2000 | Smith et al. | 705/5 |
| 6,094,641 A | 7/2000 | Ouimet et al. | 705/10 |
| 6,101,484 A * | 8/2000 | Halbert et al. | 705/26 |
| 6,260,024 B1 * | 7/2001 | Shkedy | 705/37 |
| 6,408,283 B1 * | 6/2002 | Alaia et al. | 705/37 |

FOREIGN PATENT DOCUMENTS

| | | |
|---|---|---|
| JP | 41120246 A | 10/1997 |
| WO | WO 99/01822 | 1/1999 |

OTHER PUBLICATIONS

Charles R. Plott and Jared Smith, Instability of equilibria in experimental markets: Upward-sloping demands, externalities, and fad-like incentives, Southern Economic Journal, Jan. 1999, vol. 65, iss. 3.*

Paul A. Leonard, "Competitive bidding for municipal bonds: new tests of the underwriter search hypothesis" Municipal Finance Journal, Winter 1999, vol. 19, iss. 4.*

Handbook of Mathematical Functions with Formulas, Graphs, and mathematical Tables Edited by: Abramowitz, M.; Stegun, I.A. 1972 U.S. Department of Commerce p925-964.*

Carroll, et al., "Evolutionary Change in Product Management Experiences in the Car Rental Industry", INTERFACES 25:5 Sep.-Oct. 1995, pp. 84-104.

Williamson, "Airline Network Seat Inventory Control: Methodologies and Revenue Impacts", Flight Transportation Laboratory Report R 92-3, Jun. 1992.

"Net Risks Pay Off for Hyatt Hotels, State of Iowa", Network World, vol. 11:47.

Bitran et al., "An Application of Yield Management to the Hotel Industry Considering Multiple Day Stays", Operations Research, vol. 43, No. 33, May-Jun. 1995.

Phillips, "A Marginal-Value Approach to Airline Origin and Destination Revenue Management", Proceedings of the 16th IFIP Conference on System Modeling and Optimization, 1994.

Phillips, "A Note on Leg Marginal Values and Bid Prices", Decision Focus Incorporated, Apr. 1994.

Curry, "Optimal Airline Seat Allocation with Fare Classes Nested by Origins and Destinations", Transportation Science, vol. 24, No. 3, Aug. 1990.

Curry, "Optimum Airline Seat Allocation with Fare Classes Nested by Origins and Destinations", Aeoronomics Incorporated, 1988.

Swan, "Revenue Management—Myths and Methods", United Airlines, Jul. 1988.

Wollmer, "An Airline Seat Management Model for a Single Leg Route when Lower Fare Classes Book First", Operations Research, vol. 40, No. 1, Jan.-Feb. 1992.

Gallego et al., "A Multi-Product Dynamic Pricing Problem and Its Applications to Network Yield Management", National Science Foundation, Jan. 18, 1994.

Belobaba, "Application of a Probabilistic Decision Model to Airline Seat Inventory Control", Operations Research, vol. 37, No. 2, Mar.-Apr. 1989.

Belobaba, "Origin-Destination Seat Inventory Control", Flight Transportation Laboratory, Massachusetts Institute of Technology, Oct. 27, 1987.

Gupta, et al., "A Practical Approach to Network-Based Seat Inventory Management", Integrated Decisions and Systems, Inc., 1993.

Drew, et al., The Effect of Contract Type and Size on Competitiveness in Bidding, Construction Management and Economics, Abstract, Sep. 1997.

Anthes, Stat Tool Weeds Out Bid-Rigging Companies, Computerworld, vol. 27, Jul. 1997.

Luk et al.:"Interaction Between Land-Use/Distribution and Assignment", Institute of Engineers, Australia, 11 nation Circuit, Bartonm A.C.T. 2600, Australia; Apr. 1980, (Abstract Only).

* cited by examiner

TARGET PRICING SYSTEM

CROSS-REFERENCE TO RELATED APPLICATIONS

This application claims the benefit of U.S. Provisional Application Ser. No. 60/123,345, filed Mar. 5, 1999, Ser. No. 60/122,958, filed Mar. 5, 1999, and Ser. No. 60/178,501, filed Jan. 27, 2000.

BACKGROUND OF THE INVENTION

1. Field of the Invention

This invention generally relates to a system and method for generating target prices for competitively bid goods and services. More particularly, the present invention relates to a system and method for generating target bid prices in a business-to-business selling environment that takes into account such factors as the cost of serving customers, the customer's price sensitivity, and the competitive environment including potential competitor response to bid pricing levels.

2. Description of the Related Art

In certain industries, companies bid on work to be performed on behalf of third parties, such work typically being either the production of a product or the provision of a service. Such companies often competitively bid against one another for a contract to perform work for a specific third party. In making a bid for a contract or to provide a certain set of products or services, the goal is to make an exact bid where the company balances the likelihood of winning the bid at a given price with the profit that will be obtained if the bid is won at that price, or bid a "target price" for the given contract.

In order to make a satisfactory bid to obtain a contract or other agreement for the provision of a product or service, a company must evaluate the aspects for the specific bid parameters that, if properly reflected in the bid price, enable the company to properly balance the likelihood of winning the bid with the profit achieved is the bid is won. Traditionally, bid pricing has been assisted by computer systems that estimate the cost of serving individual customers, taking into account the special factors affecting the bid price. These typical "cost-of-service" based bidding systems compute a price floor or minimum bid for a prospective contract or other agreement based on the cost of delivering the products or services and the actual calculation of profit for the contract is subjectively left to the company. Consequently, while the traditional cost-of-service based bidding systems can provide guidance on the minimum bid, they provide no guidance for the optimal way to balance the likelihood of winning the bid with the profit achieved if the bid is won. This guidance can only be provided if a target price is established that balances the likelihood of winning the bid with the profit achieved if the bid is won by maximizing the expected profit that is achieved from the target price.

Furthermore, traditional cost-of-service based bidding systems have a number of drawbacks as pricing tools for competitively bid goods and services as they lack the ability to factor the market response of customers and competitors to pricing decisions. This is mainly because the systems are cost-focused, even though shipping clients may increasingly demand products and services that are tailored to their specific needs. The traditional cost-of-service based bidding systems also lack the ability to track and analyze post-bid information, such as wins and losses, profitability of won bids, and otherwise capture useful data which can be analyzed for the generation of future bids.

There are systems in the art, such as in airline seat and commodities pricing, that can reflect market and competitor response characteristics in bid pricing. However, such systems typically generate pricing information for an individual product or service at a particular point in time, such as an airline seat on a particular flight or a specific commodity futures contract. As a result, these systems are not directly applicable to bidding systems for parcel shipping services, which usually price a portfolio of parcel shipping services to be performed over an extended contract period.

Thus, there is a need for a method of bid pricing that takes market and competitor response characteristics into account when generating bid prices. There is a further need for a bid pricing method that takes market and competitor response characteristics into account when generating bids for portfolios of products and services to be performed over extended contract periods. It is to the provision of such an improved system and method that the present invention is primarily directed.

SUMMARY OF THE INVENTION

Target Pricing (TP) enables a corporation to optimize its pricing and associated business processes in order to increase profit. TP leverages information about competitors, costs, and market response behavior to set customer-specific prices that maximize expected financial contribution. The resulting incremental improvements in profitability can add up to significant gains: at UPS, TP increased profits by over $100 million per year over previous business practices.

The present invention meets the needs described above in a business process and computer system known as the "Target Pricing System" (TPS). The TPS is a bid pricing system that takes the following factors into account when generating bids for a portfolio of goods or service to be performed over and extended contract period: (1) the cost of completing the contract, (2) the customer's price sensitivity and the relative importance of non-price factors, and (3) the competitive environment, including actual or potential competitor bids. In considering these factors, the TPS strives to achieve the best balance between the likelihood of winning a bid and the profit to be earned from the contract (i.e., the contribution margin) if the bid is won.

More specifically, the TPS generates a market response curve for each bid that reflects the likelihood of winning the bid as a function of bid price. The TPS also generates a corresponding contribution margin curve for the bid based on the cost of completing the contract as a function of bid price. The products of these two curves produces the expected contribution curve as a function of bid price. The bid price corresponding to the peak value of this expected contribution curve is the target price, or optimal bid price, for that particular bid.

An important aspect of the TPS is the ability to develop accurate market response curves for individual bids. These market response curves are generated by identifying a number of factors that appear to influence the ultimate market response. To isolate the correlation between specific drivers and the ultimate market response, a large database of historical bid information is constructed. This database includes bid price and win/loss data for each bid, as well as information relating to the various factors for each bid. Regression analysis is then performed on the data to identify the correlation between the various factors and the market response. These correlations, which are referred to as "drivers," are then used to predict market response for future bids. That is, the development of market response curves involves (1) identifying factors that appear to influence the ultimate market response, (2) gathering a large historical database of bid information and these factors, (3) applying regression analysis to identify statistical correlations between the factors and the market response, and (4) using these correlations as drivers to create market predictive response curves for future bids. This approach can be used to develop separate customer and competitor response curves, or it can be used to develop a single or combined market response curve. This approach can also be segmented by geographical region, type of customer, type of service (e.g., air and ground shipping) or any other type of division that appears to be appropriate for a particular application.

It should be appreciated that the specific drivers will change based on the type of service or good under bid and many other factors. As a result, the process of developing market response drivers for a particular bid system is an important aspect of the invention, whereas the specific drivers identified for the parcel shipping industry is typical example of drivers that may be identified in to a particular application of the invention.

While the invention includes a computer-based TPS for generating target prices as described above, it also defines a process for creating the TPS and for using the TPS system as a support and training tool for marketing personnel. Specifically, the process includes creating the a TPS, using TPS to improve pricing guidance for marketing personnel, streamlining the bid process by empowering marketing personnel to make bids based on the TPS recommended target price, monitoring the success of the TPS in predicting bid win/loss outcomes, and continually refining the TPS. This system refinement process includes monitoring the success and accuracy of the TPS, periodic updating to reflect new bid data in the TPS, the identification of new factors that appear to influence the market response and incorporation of these factors as new drivers in the TPS, and refinement of ways in which marketing personnel interpret and use the target prices produced by the TPS.

It should be understood, therefore, that the invention is generally applicable as a method and computer-based bidding system for a wide range of industries, and may be applied to bid pricing systems for goods as well as services. Although the system is particularly useful for identifying and utilizing factors that influence market response for portfolios of services, the same techniques may be applied to predicting the market response to bid prices for individual goods or services.

Other objects, advantages, and features of the present invention will become apparent after review of the hereinafter set forth Brief Description of the Drawings, Detailed Description of the Invention, and claims.

DETAILED DESCRIPTION OF THE INVENTION

Figure 1:
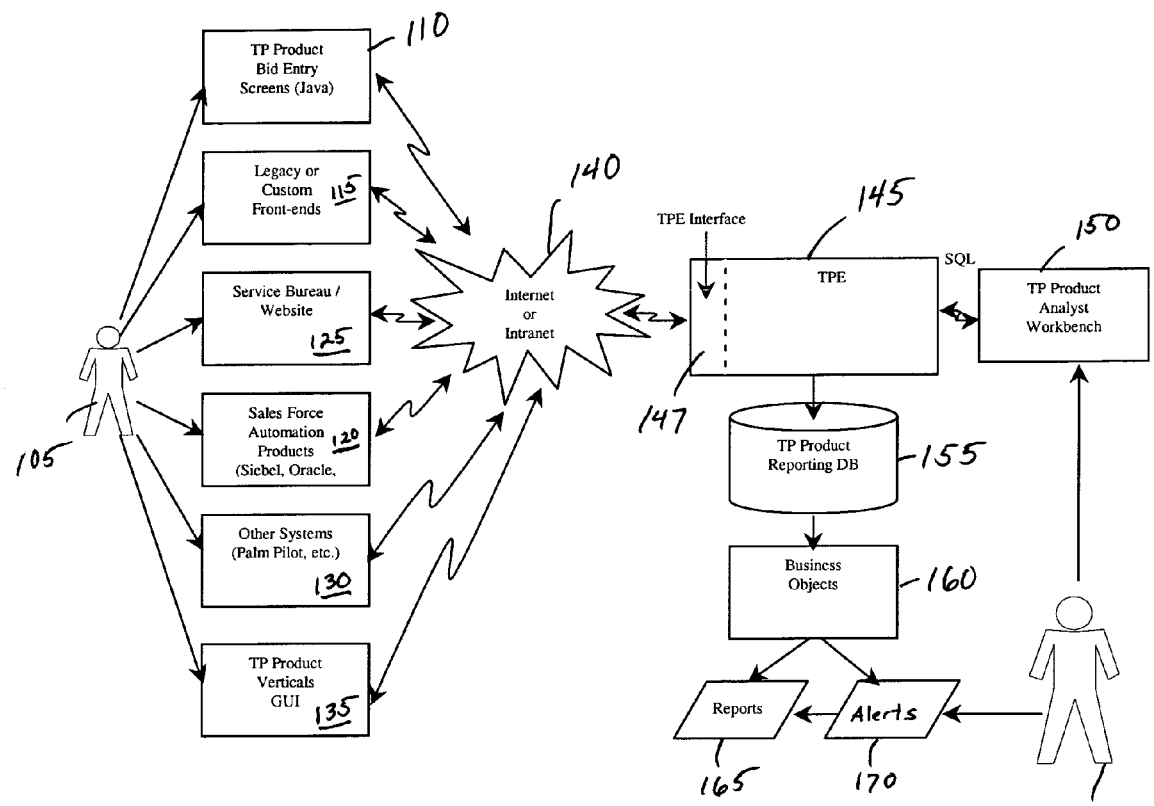
FIG. 1 is a block diagram of components in a typical TPS according to the present invention.

With reference to the drawings and the specification for the present inventive target pricing method, the terms as used herein are hereby defined as follows:

"Account": The highest level in business to business transactions. Accounts represent relationships with client businesses.

"Allowable Range": When gathering bid information, account executives can provide field observations of the competitor net price rather than rely on the competitor net price model. The allowable range specifies how far the determined value may be from the model's estimated competitor net price. The allowable range is ultimately determined by the system owner. See also Warning Range.

"Bid": A bid is a clearly specified package of goods and services (called products in the Target Pricing context) for which the price will be negotiated (rather than automatically quoting list price). Also called a bid proposal.

"Bid Characteristics": Predictors based on attributes of the bid system object (as opposed to those based on attributes of the account system object).

"Bid Drivers": See Predictor.

"Bid Status": Bid status specifies the current stage of negotiation for a given contract. Bid status currently supported by the Target Pricing system include:

"Under Construction": Account executive is in the process of putting the bid together.

"Pending": Account Executive is currently negotiating the bid.

"Accepted": The contract for the bid has been signed.

"Rejected": The bid was not acceptable to the customer.

"Inactive": The bid was previously active, but the contract has ended.

"Coefficient": Every predictor has an associated coefficient calculated by the Market Response Model. Win probability is a function of these predictors (which measure key attributes of the accounts and the bids) and their coefficients (which measure the relative weights of the predictors in estimating win probabilities). Also called a regression coefficient, since they are calculated using a statistical regression routine.

"Company": An object storing information about the business using target pricing and its competitors. Client businesses are referred to instead as accounts.

"Competitor": A company whose products may be chosen by accounts to the exclusion of those of the Target Pricing user. More specifically, an object which records interesting data about the (physical) competing company. Associated with competitor objects are competitor products and a competitor net price model.

"Contribution, Expected": The product of marginal contribution and win probability (expected contribution=marginal contribution×win probability). The expected contribution curve is the product of the market response curve and the marginal contribution curve, and shows expected contribution as a function of net price.

"Contribution, Marginal": A measure of net revenue showing the excess of revenue over immediately incurred costs (marginal contribution=net price−marginal cost). The marginal contribution curve depicts the relationship between net price and marginal contribution. This "curve" is always a straight line.

"Cost": All references to costs or cost models herein typically refer to marginal costs. One can track other cost measures (including allocated overhead and opportunity costs) for reporting purposes.

"Cost, Marginal": The incremental and avoidable costs of meeting the service requirements of the bid proposal. If the proposal includes a probabilistic element like warranty service, then the marginal cost is implicitly an expected value.

"Cost Model": An object which estimates the marginal cost of a product using a lookup table and an (optional) interpolation algorithm. Models may estimate prices using zero to three dimensions or through a functional relationship or from external sources.

"Discount": The usual mode of operation for target pricing is to accept list prices and compute target discount levels. Discounts can be specified in terms of percentage off of list price, absolute dollar price, absolute dollar discount and ratio of our net price to competitor net price. Unless context clearly dictates otherwise, the use of the term dollar or dollars will be taken to refer to not only dollars but to all currency types.

"Duration": Duration is specified in the system to help convert quantities entered at one level to another. (E.g. if a weekly order for a product is entered in the system, but the market response model is maintained for quarterly quantities, the system converts quantities from one period to quantities over the other period automatically.) Examples of these periods include: Daily, weekly, monthly, quarterly and yearly.

"Global Dimension": The target pricing method includes a global dimension list specifying all of the axes along which accounts, bids, or companies may be aggregated. These global dimensions are used anytime a collection of these objects must be specified or selected, and by default include all of the attributes of the objects.

"Marginal Contribution": Contribution made to the bottom line as a result of selling one unit (marginal contribution=net price−marginal cost).

"Market Response Parameters": Synonym for coefficients. See also Parameter.

"Market Response Curve": The market response curves shows the probability of winning a bid as a function of net price, for a particular market segment and holding competitor net price constant. Determining the market response curves is one of the major consulting tasks at the time of implementation, and is discussed herein.

"Market Segment": A distinct cluster of customers whose buying behavior (market response curves) is similar. Such a cluster is defined in terms of key measurement axes called market segmentation criteria, represented in the system as global dimensions. Together these criteria specify the market segmentation scheme, and capture all aspects of a customer that are of interest in predicting win probabilities.

"Option": A product feature that can be acquired for an additional payment. Target pricing can also use options to model closely related products as variations of a single "virtual product" which may not be offered in the market as a standalone. Zero or more options may exist for a given product. Options are maintained in units per unit of product. (e.g. three-year warranty for one automobile).

"Order, Option": An object storing information such as quantity desired for any options ordered as part of a product order.

"Order, Product": An object storing information such as quantity desired for each product involved in a bid.

"Parameter": A parameter is an object that controls the system's behavior or performance. These include the current definitions of global dimensions and predictors, and the current values of the coefficients. They also include various switches and values indicating preferred algorithms (where there are choices), an example being the choice of currency units. The collection of all parameters is called a parameter set. While only one parameter set can be active at a time, all historical parameter sets are stored to support retrospective analysis of performance.

"Predictor": Predictors are measurements or indicator variables used to estimate (or "predict") the win probability for a bid. They can be based on attributes of either the bid or account objects. Initial sets of predictors, called bid drivers, are defined at the time of system installation. Additional predictors can then be created by the system owner using the existing ones and any global dimensions. The market response model fits a coefficient for every predictor.

"Price, List": The "standard" price for customers who do not negotiate, or the starting price for negotiations. "List" prices may or may not be publicized.

"Price, Maximum": see Price Range.

"Price, Minimum": see Price Range.

"Price, Net": Price net of discounts off the list price.

"Price, Target": The price which balances win probability and marginal contribution to maximize expected contribution. The constrained target price must maximize expected contribution subject to specified strategic objectives, while the unconstrained target price shows the optimal price in the absence of such long-term considerations.

"Price Model": An object that estimates prices using a lookup table and an (optional) interpolation algorithm. Price models are used to provide list prices and competitor net prices, and may estimate prices using zero to N dimensions or through functional relationships or by retrieval from external systems.

"Price Range": As well as the contribution-maximizing target price, target pricing computes a minimum price and a maximum price within which account executives can negotiate bids.

"Product": Products are the smallest items for which an optimum discount level is computed. Physical products are represented using both product and option objects. The list of products is maintained by the user, along with list price and cost information, the list of their available options, and any competitor products that compete with them.

"Product Line": A collection of similar products. Target pricing allows a single price model to be shared by all of the products in a product line.

"Revenue": Target pricing uses several measures of revenue and profit. See Contribution, Expected; Contribution, Marginal; Revenue, Gross; and Revenue, List.

"Revenue, Gross": All revenue received from the customer, i.e. the price that was offered and accepted (gross revenue=list price*(1−discount)*quantity).

"Revenue, List": The revenue that would be received if a bid were won without offering any discount (list revenue=list price*quantity).

"Strategic Objectives": Business requirements established by senior management to promote long-term corporate growth, possibly at the expense of near-term profits. Target Pricing supports direct entry of binding constraints in terms of:

"Minimum Success Rate": All affected bids will be priced to maintain the specified minimum win probability.

"Maximum Success Rate": All affected bids will be priced to maintain the specified maximum win probability.

"Profit Margin Objectives": All affected bids will be priced to maintain the specified gross margin (gross margin=1−gross revenue/marginal cost).

"Success Rate": The ratio of bids accepted to bids offered.

"Win Probability": Estimated probability of winning a bid at a given net price. The function relating win probabilities to net prices (holding all else constant) is the market response curve, sometimes called the win probability curve.

The present inventive system and method calculates the optimum target price for making a bid which will be both profitable to the company making the bid, and which takes into account the likely bids of other third party bidders such that the company's bid is competitive. Furthermore, as this application claims the benefit of U.S. Provisional Application Ser. No. 60/123,345, filed Mar. 5, 1999, Ser. No. 60/122,958, filed Mar. 5, 1999, and Ser. No. 60/178,501, filed Jan. 27, 2000, the subject matter of those applications is expressly incorporated herein by this reference.

At a high level, the TP system can be envisioned as depicted in FIG. 1. The Account Executives 105 on the left side, enter bids into the system through one of several types of computer interfaces:

The TP Bid Entry screens 110. These screens are provided with the TP system for customers who do not want or need one of the other alternatives.

A Legacy Account Management System 115. This is usually a proprietary solution developed by the user. For example, the IAS system at UPS.

A Sales Force Automation System 120. These are usually purchased from a 3rd party software provider, such as Siebel, Baan, Vantive or Oracle.

A service bureau 125. Uses the standard TP bid entry screens, but linked to a Talus-managed server.

Other systems 130. Interface screens developed specifically for alternative hardware/software tools used by Account Executives, e.g., PalmPilot.

Product Vertical Interface 135. Interface provided as part of the product, but customized for a particular industry, e.g., freight transportation.

Each of these different types of GUI's is used to collect account and bid information. The GUI then submits a completed bid via a communications link 140, which in a preferred embodiment may be a communications network such as the Internet and/or intranet, to the Target Price Engine (TPE) 145, which performs the optimization and returns the optimal price range at which to offer the bid. The TPE 145 in a preferred embodiment includes a TPE interface 147 to the various input options. The Account Executive 105 presents the proposal to the customer and then negotiates with them. Once the final status of the bid has been determined (won or lost), the bid is updated in the system.

The TPE 145 supports analysis via an analysis interface 150. The TPE 145 may also generate in some embodiments product report data, which may populate a reporting data store 155. Data extracted from this data store 155 may form the basis of business objects 160 that may be used in reports 165 and alerts 170.

Figure 2:
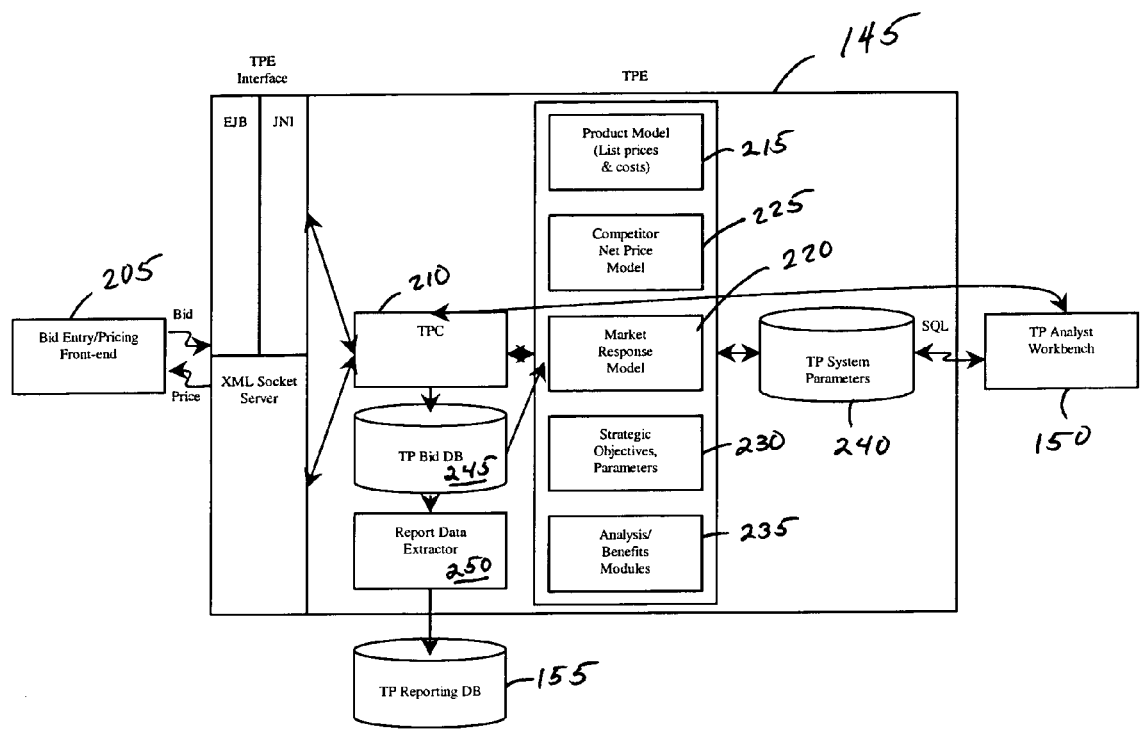
FIG. 2 is a block diagram of the components in a typical Target Pricing Engine (TPE) 145 as seen in FIG. 1.

FIG. 2 provides a more detailed block diagram of a typical TPE 145. Bid information is collected via a front-end interface 205 such as those described above and submitted to the TPE 145. This information is received by the TPE interface 147 that extracts the information which is received in one of a variety of established communications formats such as EJB, JNI, XML or other suitable encoding. The extracted information is passed to the Target Pricing Calculator (TPC) 210. The TPC uses parameters developed by the batch system, in order to perform its optimization in real-time. The key inputs are the product model (including costs) 215, and the parameters used for calculating market response. The Market Response Model (MRM) 220 is run at regular intervals to update the market response parameters in response to recently observed bid data. The System Owner is responsible for running the MRM, for ensuring that the required inputs are entered into the system, and for vetting its outputs before they are used by the TPC. The MRM can be run manually or on an automated (batch) or semi-automated basis. The TPC may also utilizes information derived from a competitor net price model 225, strategic objectives 230 and an analysis/benefits module 235. Data for the various models may be stored in a system parameters data store 240. TPC bid information may be stored in a bid data store 245. A report data extractor 250 may be used in some embodiments to extract bid data from the bid data store 245 and to place the extracted bid data in a reporting data store 155.

The various data stores may be implemented via a variety of organizational structures such as a database architecture, a file storage scheme or other structure as will be known to those skilled in the art. In a preferred embodiment, a relational database is used as the storage structure; however, hierarchical, object-oriented, spatial or other database architecture could be used. Further, the data store could be organized in flat files utilizing an appropriate structuring such as flat record tables, hash record tables or other known organizational structure.

To calculate the target bid price, several steps need to be performed. Initially, the bid must be priced preferably using the list prices in a product model, as discussed below. These prices may be gathered directly from current data or obtained from a 3rd party or proprietary pricing system. Other third party software products such as Siebel Sales and Trilogy SC Pricer can be used in generation of the initial prices.

Then the bid is costed using the costs in the product model. These costs may either have been gathered manually or obtained from a proprietary costing system from third parties as is known in the art or could be retrieved in real-time from external systems.

Once the bid is costed, then an equivalent competitor net price for the bid is calculated. This is the price the competitor(s) would charge to this customer after any discounting has occurred. The list prices for competitor products are preferably maintained in the product model, but an appropriate discounting mechanism must be applied to the list prices to determine the net price. This is preferably done by a competitor net price model as discussed below.

Then, the probability of winning the bid as a function of the company's price is calculated. This is preferably calculated using the parameters from a market response model as described below.

In addition, the benefits of target pricing over the company's existing pricing approach can be calculated. The logic for the pre-existing pricing method is preferably maintained in a benefits model as described below.

As is apparent from review of the above steps, the present inventive method is readily adaptable for use in an automated system, such as in software executing on a computer platform. Nonetheless, the steps of the present method can be performed by hand as the models as disclosed herein can be generated and maintained manually.

The method further preferably includes optimization processes to generate the optimum target bid price. The first optimization step is to compute the price that maximizes the expected contribution for the bid, which is done by balancing the contribution which increases as price increases, and the win probability, which decreases as price increases.

Given the target price computed above, any discounts must be applied to each product within the bid. This is performed using a second optimization process. The steps of balancing the contribution and the win probability are repeated taking into account any strategic objectives that have been specified. Examples of strategic objectives such as minimum success rates can override the initial values calculated.

The present inventive method utilizes a market response model in calculating the target bid price. The market response model (MRM) calculates the win probability as a function of price through the examination of historical bid information at various prices. The MRM requires that the customers be segregated into distinct market segments. The market segments are determined through a detailed analytical investigation prior to the use of the present method. A further module that is alternately used in the present method is a reporting module that is used to produce reports on a regular or ad-hoc basis.

The market response model (MRM) provides two main services which include:
1. Computing a market response for a bid
2. Generating model coefficients given market response variables.

To provide these services the market response model supports lower level services which include:
1. InitializeMRMForBid. The Target Pricing Calculator (TPC) invokes this service once for each bid prior to starting the optimization. Once a bid is known, the values of all variables except those based on price are known. This service evaluates each of the price-independent variables and computes their sum.

Input
  Active Parameter Set (reference to object)—query to object server
  Bid (reference to object)—parameter passed by TPC
  Account (reference to object)—lookup from bid object Output
  No direct outputs for this setup step. On completion saves the sum of the computed price-independent terms.
  Returns status code and description. The following status codes should be supported:
  1. Successful completion
  2. Ignoring competitor(s) unknown to MRM (names of competitors in description)
  3. Unknown competitors using parameters for 'generic competitor' (names of competitors in description)
  4. Failed to transform variable(s) (name of variables in description)

Invokes: TransformPriceIndependentVariables (implemented in 'black box')

Description: The TPC calls this service prior to doing the optimization. During the optimization the system user's average bid-level price is the only variable in the market response function. This service determines values of the indicator and bid (predictor) variables. It partially computes the market response model formula by finding the sum of the price-independent terms, retaining price-dependent terms as variables.

Procedure: The active parameter set contains the model parameters, definitions of model variables and the type of model to use (for the preferred embodiment this is either binomial logit or multinomial logit).
  1. Find Model Type from Active Parameter Set (model type can be binomial logit or multinomial logit).
  2. Compare list of competitors in bid with competitors in Active Parameter Set. Return appropriate status code. The following steps must be completed for all status codes except 'Failed to transform variable(s)'.
  3. Take each price-independent term from the expanded model representation in the active parameter set and compute its value.
  4. Sum the values of the price-independent terms in the active parameter set and store the values.

At the end of this step the market response model formula for computing the win probability becomes:

Binomial Form:

$$\text{prob (Win)} = \frac{1}{1 + e^{k + \text{price\_dependent\_terms}}}$$

where prob (Win) is the probability that the system user wins the bid and k is the sum of the price-independent terms. This formula assumes the other (than system-user) as the reference in the model.

This formula will return the probability of winning for the system user if we code the dependent or response variable such that '0' signifies a win for the system user and a '1' for a loss. Another way of saying this is that the system user is used as reference. The system user should be used as the reference because the system user is the only choice that is available on every bid.

Knowledge of the reference is important because the use of a reference determines the interpretation of the parameters and the form of the price-dependent terms (in general all choice dependent terms). If the 'other' is used as the reference, then all prices should be relative to the other. Thus we might use $(P - P_{other})$ or $$\frac{P}{P_{other}}$$

or some functional transformation of one of these to obtain the relative price. The price-dependent terms are computed in the custom code and thus the form of the price terms will be determined by its implementation.

Multinomial Form:

$$\text{prob (win)} = \frac{1}{1 + \sum_{j \in J} e^{k_j + \text{price\_dependent\_terms}_j}} \text{ where } {}^{k_j} \text{ is}$$

the sum of the price-independent terms indexed by competitor 'j'.

J' is the set of all competitors named in the bid. This form of the formula assumes that the system-user is used as reference in the model.

2. CalculateWinProbabilityGivenPrice. The Target Pricing Calculator (TPC) invokes this service during the line search to determine the target price. The values of the price-dependent variables are computed based on the given price. This is plugged into the formula along the values computed by InitializeMRMForBid to obtain the win probability.

Invoked by: Target Pricing Calculator (TPC)

Input:
  Average bid-level price for system user's bid—parameter passed by TPC
  Active Parameter Set (reference to object)—system parameter
  Bid (reference to object)—parameter passed by TPC
  Account (reference to object)—lookup from bid object
  Values computed by InitializeMRMForBid Output:
  Win probability corresponding to the input price.
  Status code
  The following status codes should be supported:
  1. Successful
  2. Failed to transform variable(s) (with variable names in description)

Invokes: TransformPriceDependentVariables

Precondition: InitializeMRMForBid is invoked before this service.

Note: Average bid-level price is given by:

$$\frac{\sum_i p_i * q_i}{\sum_i q_i}$$

where Pi and $q_i$ are price per unit and quantity in product order i.

Procedure:
  1. Invoke TransformPriceDependentVariables once for each competitor. Invoke with system user's price and competitor's price.
  2. Sum the values of the price-dependent_terms in the model.
  3. Obtain model type from active parameter set.
  4. Evaluate the following formula based on model type:

Binomial Form $$\text{prob (Win)} = \frac{1}{1 + e^{k+m}}$$

where prob (Win) is the probability that the system user will win the bid, k is the sum of the price-independent terms, and m is the sum of the price-dependent terms.

Multinomial Form $$\text{prob (Win)} = \frac{1}{1 + \sum_{j \in J} e^{k_j + m_j}}$$

where prob (win) is the probability that the system user will win the bid, $k_j$ is the sum of the price-independent terms indexed by competitor 'j', $m_j$ is the sum of the price-dependent terms indexed by competitor 'j' and 'J' is the set of all competitors named in the bid.

This formula assumes that the system user is used as the reference.

3. GenerateMRMCoefficients. This service is invoked from the Analyst WorkBench. The data filters are applied to the historical bids in the database to obtain the set of bids that will be used for model fitting. The regression is run to obtain the coefficients of the variables. The model diagnostics are written into an output file.

Invoked by: Analyst Workbench

Input:
  Parameter Set (reference to object)—query to object server
  Set of historical bids—query to object server Output:
  Coefficients of MRM variables (save to parameter set)
  Error in coefficient estimates (save to output file)
  Model fit parameters (save to output file)
  Invokes: TransformPriceDependentVariables, TransformPriceIndependentVariables, TransformDiscreteVariables Procedure: This procedure performs regression for different model types. Currently, 'multinomial logistic' and 'binomial logistic' models are supported. The model type is indicated in the parameter set.
  1. Apply date filter and 'Exclude Bid' flag to set of historical bids to leave out undesired bids (if 'Apply Exclude Bid' flag was set by user—this is indicated in the parameter set).
  2. Apply filter rules described in next paragraph
  3. Invoke TransformPriceIndependentVariables, TransformPriceIndependentVariables and TransformDiscreteVariables on each bid to form dataset for regression.
  4. Run regression for Model Type in Active Parameter Set. The details of the regression computations are not described in this document. Binomial statistical regression will be performed using the services of third-party software such as Roguewave.
  5. Save output of regression in output file. This includes model fit parameters (likelihood ratio test) and standard errors in coefficient estimates. The location of these files is stored as a system parameter (LOG_FILES_LOCATION).

6. Save coefficients from regression in active parameter set.

Filter Rules
1. Exclude bids won by competitors NOT named in the list of competitors in the Active Parameter Set if 'Generic Competitor' option is not set. Do not exclude if this option is set.
2. Exclude bids with 'Exclude Bid' flag set (if chosen).

Error Situations: The following error situations can occur:
1. Market segment variables in MRM undefined in bid
2. Market segment variables has invalid value in bid.

These conditions occur when new market segment variables have been created or existing ones modified after the bid was last updated.

4. ExpandParameterSet. This service is invoked by the Analyst WorkBench prior to running the regression or displaying the model coefficients if the parameter set does not contain the expanded model representation.

Invoked by: The object server during the process of setting a parameter set as the active one.

Input:
Reference to Parameter Set
Market Segment Definitions
Discrete Bid Attributes Definitions Output:
Expanded representation for the Parameter Set (see Addendum B1 for Expanded Representation)

Procedure:
1. Clear existing expanded representation if applicable.
2. Refer to market segment variable and discrete bid attribute definitions and find cross-products of the crossed discrete variables.
3. Use the "Indicator Variable Creation Rules" in next paragraph to create indicator variables.
4. Save representation along lines described in Addendum B1.

Rules for Creating Indicator Variables
1. Competitors: If there are 'n' competitors and a system user (total of n+1 companies), create 'n' indicator variables for competitors. The system user will be the reference, thus, no indicator variable will be defined for the system user.
2. Discrete Variables: If a set of crossed discrete variables has 'n' possible values then 'n' indicator (dummy) variables needs to be created. Only (n−1) of these will actually be used, however. The choice of which to leave unused is based on the following:

If the model coefficients are entered into the system by the user, the user chooses which cross-product term to leave out. This choice is indicated by entering a NULL coefficient for the chosen cross-product term.

If the model coefficients are generated by running a regression within the system, the system arbitrarily chooses the cross-product term to leave out.

5. TransformPriceDependentVariables. This service is invoked by the following two services: CalculateWinProbabilityGivenPrice and the GenerateMRMCoefficients. It produces a set of values of market response drivers each of which involves a price variable and possibly other bid attributes. Bid attributes may refer to new bid, currently active bid or historical bids.

Invoked by: CalculateWinProbabilityGivenPrice, GenerateMRMCoefficients

Input:
Reference to bid being evaluated (passed as parameter)
System User's Price (passed as parameter)
Competitor net price (passed as parameter)

Output:
Values of transformed bid attributes

Procedure: Since the number and identity of competitors varies by bid, TransformPriceDependentVariables will only produce the values of price-dependent variables based on one price variable at a time (either system user's or competitors' price). Thus CalculateWinProbabilityGivenPrice must invoke TransformPriceDependentVariables once for each price variable.

6. TransformPriceIndependentVariables. This service is invoked by the InitializeMRMForBid and the GenerateMRMCoefficients services. It produces a set of values of market response drivers involving functional transformations of non-price bid attributes. Bid attributes may refer to new bid, currently active bid or historical bids.

Invoked by: InitializeMRMforBid, GenerateMRMCoefficients

Input:
Reference to bid being evaluated (passed as parameter)

Output:
Values of transformed bid attributes

7. TransformDiscreteVariables. Produce a set of values of market response drivers.

Invoked by: InitializeMRMforBid, GenerateMRMCoefficients

Input:
Reference to bid being evaluated (passed as parameter)

Output:
Values of transformed bid attributes

8. GetPriceDependentVariableNames.
9. GetPriceIndependentVariableNames.
10. GetDiscreteVariableNames.
11. GetDiscreteVariableLevels.

These last four services return the names and descriptions of the market response drivers whose values are produced by TransformPriceDependentVariables, TransformPriceIndependentVariables and TransformDiscreteVariables.

Figure 7:
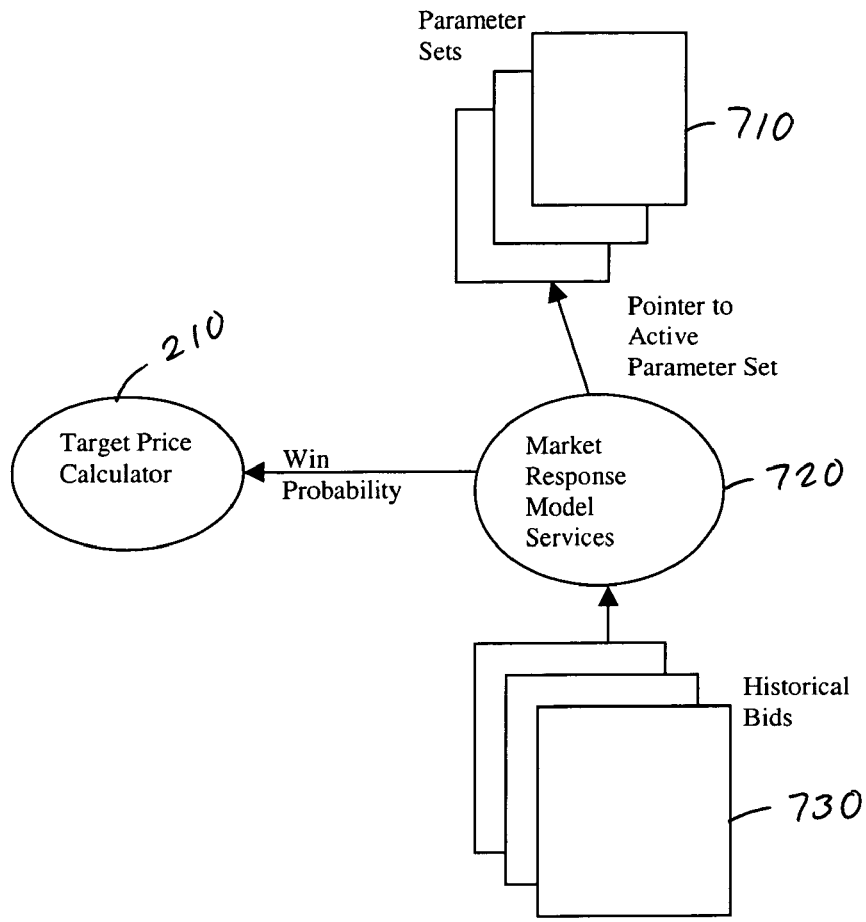
FIG. 7 is a block diagram illustrating the interactions of the market response model with other system components.

FIG. 7 illustrates the MRM, which consists of the model parameter sets 710 and the services 720 as enumerated above, and its interactions with the Target Price Calculator (TPC) 210 and the historical bids 730.

Many situations require that the target pricing user select or specify a group of similar objects, for example "all small accounts." This is implemented with a "global dimension object," which specifies a grouping variable (like size) derived from the attributes of an object. This operation can be applied to company, account, bid or product objects, and is used in market response modeling for estimating how different types of customers react to different prices. It is also used in reporting as it enables the user to analyze results in order to understand system and/or customer behavior. Further, the global dimension object can be used in applying strategic objectives which enable the user to modify the default operation of the system in order to achieve specific strategic goals, such as minimum win rates.

The dimensions allow competitor net price modeling which enables the user to model competitor discounting behavior once again using some form of market segmentation. It also allows benefits modeling that enables the user to model pre-existing ("business-as-usual" (BAU)) pricing methods.

Global dimensions are created whenever the user of target pricing desires to do one of the above. And as one might assume, they can be used for more than one of the above purposes. For many of these uses, the global dimensions are used for segmenting the TP user's customers, i.e., as market segmentation criteria.

There are three distinct types of global dimensions: discrete, continuous, and hierarchical. Discrete segmentation is used to group customers into specific buckets. For example, consider the following discrete market segments: North, South, Other. A customer will be grouped into one and only one of the 3 segments: North, South or Other.

Continuous segmentation is used to group customers into specific buckets using a continuous indicator variable. For example, consider the following continuous market segments of Annual Revenues: Small: 0–$10M; Medium: $10–50M; Large: Over $50M. Customers will be grouped into either Small, Medium or Large depending on their annual revenues. As their annual revenues change or the definition of the Small/Medium/Large breakpoints changes, the customers will be automatically reclassified. The underlying continuous variable (revenue) is called the "base variable."

Hierarchical market segmentation is a specialized form of discrete market segmentation, where there is more than one layer of segmentation. For example, consider the following Hierarchical market segmentation of Geographic Region: North: Maine, New York, etc.; South: Florida, Georgia, etc. A customer from New York is classified in the New York segment, as well as the North segment.

Accordingly, market segments are used for purposes such as market response modeling, reporting, strategic objectives, price and cost modeling, competitor net price modeling, and benefits modeling.

Market segments are used for market response modeling in the following manner: any market segments that are defined for a specific TP installation are automatically available for Market Response modeling. However, it should be noted that since each segmentation criteria that is added increases the dimensionality of the sample space, there is a finite limit to the number of market segments that can be used while still maintaining the statistical integrity of the system. For example, consider the following market segments: Customer size: small, medium, large; Account size: small, medium, large; Customer region: N, SE, NW, SW; International Industry: Manufacturing, Service.

The sample space implied by this set of customer segments is: 3×3×5×2=90. This means that for every 90 bid transactions we are able to observe, there is (on average) 1 observation per (final) customer segment. In reality, since some of the market segments will be more populous than others, there will be many market segments where no observations are recorded. This characteristic may double, triple or more the total number of observations needed. In addition, note that we need wins as well as losses, so the required number of transactions will be doubled. As a result, suppose that at least 10 wins and 10 losses are needed to model each market segment (the exact number will depend on how closely correlated the data is). This implies that for the above, we will need:

```
      (90 market segments)
    * (20 observations)
    * (2.5 assumed sparseness factor)
    = 4500 observations
```

This number is reduced considerably if one of the above market segments is removed. For example, with the Region segment removed, we only need:

```
      (18 market segments)
    * (20 observations)
    * (2.5 assumed sparseness factor)
    = 900 observations
```

Market segments are used for reporting purposes. Any market segments that are defined for a specific target bid price can be used in reports. The market segments can be selected to aggregate data along the x-axis. For example, in the above example, we could produce reports that displayed average target prices by: Customer size, Account size, Customer Region, and Industry.

Market segments are used to enter strategic objectives. Examples of a strategic objective are the minimum/maximum win rates. Using the previous example, a user could decide to increase market share by: Customer size, Account size, Customer Region, and Industry. For example, a user may decide to set a minimum win rate of 40% for all Small customers in the NE who are in the Manufacturing Industry segment.

For product modeling, global dimensions are used to enable specification of product list price and (variable) costs. Any global dimensions that are defined for a specific target pricing bid are automatically available to use for price and cost modeling. Both list prices and costs are maintained in the product model.

The Product Prices and Costs in preferred embodiment may be described through a 3-dimensional (or less) table. Dimensions are chosen from the Global Dimensions list or are defined by the System Owner. The Target Pricing system will support a standard or fixed set of dimensions, termed as the "global dimensions" list. This list will most likely contain dimensions such as Size, Region, and Ordered Quantity. The system will also support the creation of a new dimension name that is not already part of the global dimension list. The dimensions defined within the global dimension list will also have the dimension categories specified. For example: Region may have categories defined as North, South, East and West; while Size may have categories defined as Very Large, Large, Medium and Small.

These definitions then populate the Price (Cost) Model templates, allowing the user to specify the price (cost) for each tuple. For example, suppose that for a particular product we had the Price Model defined over two dimensions: Region and Size, where each dimension has been categorized as follows. In this case the Price template would look like:

| Dimension 1: Region | Dimension 2: Size | Price |
| --- | --- | --- |
| East | Very Large | |
| | Large | |
| | Medium | |
| | Small | |
| West | Very Large | |
| | Large | |
| | Medium | |
| | Small | |
| North | Very Large | |
| | Large | |
| | Medium | |
| | Small | |
| South | Very Large | |
| | Large | |
| | Medium | |
| | Small | |

The System Owner would then specify the Product-Price for each 2-tuple in the above template. While defining each dimension the System Owner is also required to prescribe how the dimension categories should be interpreted. That is, "look-Up" (discrete) or "Interpolated" (continuous and exact value to be derived).

At the time of order taking (or at the time of bid construction or bid entry, as this action has also been referred to), the Sales Representative will collect the data that is required to map an account, bid and/or product order according to these dimensions.

With all the necessary information captured, the system must now compute the price (cost) for a particular product order. In what follows we have attempted to structure it as one might think through the process. What eventually gets implemented in the system may differ if efficiency short cuts are recognized and adopted. Before we proceed with the rest of the discussion, it is worth pointing out that the specifications laid out below greatly simplify when ALL dimensions within any of the different models (Price, Cost, BAU Price, Competitor Net Price) are specified as "look-up" dimensions. In that case the entire algorithm reduces to Step-1 below, which is essentially "looking up a value from a table". In every other scenario (that is, where there is at least one dimension specified as an "interpolate" dimension) the following algorithm, which may be better termed as "multi-dimensional linear interpolation", applies.

A brief summary of the algorithm is presented below before we dive into the details/specifications for each step.

Step 1: Get total number of dimensions in price (cost or other value) model. Set values for look up dimensions, and let N=number of interpolate dimensions.

Step 2: Find "segment" in which desired point lies: Box defined by 8 points if N=3; Rectangle defined by 4 points if N=2, Line Segment defined by 2 points if N=1.

Step 3: Do N iterations, each of which consists of 1 or more linear interpolations between 2 points and reduces the number of remaining points by a factor of 2. After N steps there will be just 1 point (the desired one) remaining.

Step 1: First Resolve All "LOOK-UP" Dimensions on the Product-Order

Resolve the "Look-Up" dimensions before the "Interpolate" dimensions. For example: If a product's price model has been defined over three dimensions, two of which are of "Look-Up" type and the third of "Interpolate" type. Separate these out and resolve the "Look-up" Dimensions first.

EXAMPLE 1

Consider the following scenario where a particular Product's Price model is defined along the following dimensions:

Dimension 1: Region as [States of the USA]: Look-Up

Dimension 2: Quantity as [10, 25, 50 and 100]: Interpolate

Dimension 3: Body Type as [2-Door Coupe, 4-Door Sedan & 5-Door Wagon]: Look-Up

For an Order on this Product, the Sales Representative has noted the following information in the Product Order entry screens for each dimension [CA, 80, 4-Door Sedan]. Clearly what the system should do at this point, is recognize that the "Look-Up" dimensions can be resolved immediately. That is the system should recognize that the Product Order under consideration rests between the 3-tuples: [CA, 50, 4-Door Sedan] and [CA, 100, 4-Door Sedan].

Assume that the price for the 3-tuple [CA, 50, 4-Door Sedan] is prescribed as 15,000 per unit and the price for the 3-tuple [CA, 100, 4-Door Sedan] is prescribed as 14,500 per unit. Then clearly the price for the product order 3-tuple of [CA, 80, 4-Door Sedan] lies between these two values. This is what we need to compute eventually.

EXAMPLE 2

Consider the following scenario where the same Product's Cost model is defined along the following dimensions:

Dimension 1: Region as [States of the USA]: Look-Up

Dimension 2: Quantity as [10, 25, 50 and 100]: Interpolate

Dimension 3: Distance_In_Miles as [50, 100, 250 and 500]: Interpolate

For an Order on this Product, the Sales Representative has noted the following information in the Product Order entry screens for each dimension (CA, 80, 150). Clearly what the system should do at this point, is recognize that the "Look-Up" dimension can be resolved immediately. That is the system should recognize that the Product Order under consideration rests between the 3-tuples (CA, 50, 100), (CA, 50, 250), (CA, 100, 100), and (CA, 100, 250). Then clearly the cost for the product order 3-tuple of (CA, 80, 150) lies between the cost at these four points. This is what we need to compute eventually.

Step 2: Identify "Relative Position" of the Product-Order 3-Tuple

However before we can compute the price we must first identify the "relative position" of the product order 3-tuple. In the previous example it was fairly easy since we had just ONE "Interpolate" dimension.

Let us introduce some notation before we proceed further. Let X, Y and Z denote the 1st, 2nd and 3rd "Interpolate" dimensions defined in the Product price (cost) model. Let the various categories (break-points) for X be denoted by $x[j]$ where $j=1, 2, \ldots, n_x$. Similarly for Y and Z. For any Product Order 3-tuple denoted by $(\bar{x}, \bar{y}, \bar{z})$, we could find k, l and m, for each interpolate dimension within the Product price (cost) model, such that the following is true:

$$x[k] < \bar{x} \leq x[k+1] \quad \text{Expression 1-a}$$

$$y[l] < \bar{y} \leq y[l+1] \quad \text{Expression 1-b}$$

$$z[m] < \bar{z} \leq z[m+1] \quad \text{Expression 1-c}$$

Generate the set of points that "enclose" the desired point by taking the Cartesian product of $\{x[k], x[k+1]\}$, $\{y[l],$ y[l+1]} and {z[m], z[m+1]} together with any "look-up" dimensions that may be specified.

Note: If for any dimension, Expression 1-a, 1-b or 1-c is not true (that is, a dimension value is either below the lowest break-point or above the highest break-point) then the system could adopt one of the following two possibilities consistently:

1. Hard-Boundary Conditions: The system reports an error condition. That is, if $\bar{x}<x[1]$ or $\bar{x}>x[n_x]$ (or similarly for y and z) then the system should return an error condition. Implementation of this alternative must be weighed against the chances (or probability) of such situations occurring frequently. If it is important to implement this approach (that is, report an error condition), and the system user notices this scenario arising frequently, then it may mean that the associated price, cost (or other) model should be revised to include a broader range of break points.

2. Soft-Boundary Conditions: The system returns the value at the boundary in question. The impact of this approach should be recognized in that it could translate to "disproportionate" price (cost or other value) calculations. If the system users are unaware that the "values" reported by the model are "truncated" or "capped" at the boundaries, this may lead to distrust in the system functionality and pricing recommendations.

Clearly, both approaches have their merits and demerits. My personal preference is to adopt the second approach described above, but this may not be the ideal approach in some cases (or for some clients). A way around this would be to make Soft-Boundary Conditions the default, and provide a "flag" (check-box) within the Price (Cost or other) Model template (within the Analyst Workbench GUI). The flag would allow the user to de-select the default "Soft-Boundary" approach. When de-selected the system would adopt a "Hard-Boundary" approach, which reports an error condition when the supplied values are outside the boundaries of the model description. For the Oriental release we will simply use the Soft-Boundary Condition approach.

EXAMPLE I (CONTINUED)

We have the following data provided (just one interpolate dimension)

(CA, $\bar{x}$, 4-Door Sedan)=(CA, 80, 4-Door Sedan)

Which allows us to write the analog of Expression 1-a as follows:

50<80<100

That is, as previously mentioned the desired price point lies between the price points for (CA, 50, 4-Door Sedan) and (CA, 100, 4-Door Sedan).

EXAMPLE 2(CONTINUED)

We have the following data provided (CA, $\bar{x}$, $\bar{y}$)=(CA, 80, 150)

Which allows us to write the analog of Expression 1-a and 1-b as follows (that is, a pair of inequalities this time, since we have two "interpolate" dimensions defined for the Cost model):

50<80<100
100<150<250

That is, as previously mentioned the desired price point is enclosed within the price points for (CA, 50, 100), (CA, 50, 250), (CA, 100, 100) and (CA, 100, 250). We generated these points by taking the Cartesian product of the sets {CA}, {50, 100} and {100, 250}.

Step 3: Compute the Desired Interpolated Value

We are now almost completely equipped to compute the price of the Product-Order as specified by its associated 3-tuple. The last piece of information we need to collect is the price (cost) from the Product Price (Cost) Model template for the following 3-tuples identified in the previous step.

The algorithm is an "iterative" approach along each of the interpolate dimensions. However since we know that we will be supporting "at most" 3 interpolate dimensions the number of iterations to this algorithm is bounded at 3. It successively reduces the problem size by one dimension at each iteration, until it reaches the exact solution. Before we proceed with the algorithm description, we introduce one final piece of notation. The price (cost or other value) at ($\bar{x}$, $\bar{y}$, $\bar{z}$) shall be denoted by $f_{ooo}$. Similarly, the price (cost or other value) at (x[k], y[l], z[m]) shall be denoted by $f_{klm}$. Intermediate results at points such as ($\bar{x}$, y[l], z[m]) shall be similarly denoted by $f_{0lm}$.

Iteration 1: Fix the first interpolate dimension at x=$\bar{x}$ by interpolating along the X-axis to compute the prices at the points:

1. ($\bar{x}y$, [l], z[m]): Interpolate prices at the points (x[k], y[l], z[m]) and (x[k+1], y[l], z[m])
2. ($\bar{x}$, y[l+1], z[m]): Interpolate prices at the points (x[k], y[l+1], z[m]) and (x[k+1], y[l+1], z[m])
3. ($\bar{x}$, y[l], z[m+1]): Interpolate prices at the points (x[k], y[l], z[m+1]) and (x[k+1], y[l], z[m+1])
4. ($\bar{x}$, y[l+1], z[m+1]): Interpolate prices at the points (x[k], y[l+1], z[m+1]) and (x[k+1], y[l+1], z[m+1])

Iteration 2: Fix the second interpolation dimension at y=$\bar{y}$ by interpolating along the Y-axis to compute the prices at the points 1. ($\bar{x}$, $\bar{y}$, z[m]): Interpolate prices at the points ($\bar{x}$, y[l], z[m]) and ($\bar{x}$, y[l+1], z[m])
2. ($\bar{x}$, $\bar{y}$, z[m+1]): Interpolate prices at the points ($\bar{x}$, y[l], z[m+1]) and ($\bar{x}$, y[l+1], z[m+1])

Iteration 3: Fix the third interpolation dimension at z=$\bar{z}$ by interpolating along the Z-axis to compute the price at the point 1. ($\bar{x}$, $\bar{y}$, $\bar{z}$): Interpolate prices at the points ($\bar{x}$, $\bar{y}$, z[m]) and ($\bar{x}$, $\bar{y}$, z[m+1]). This is just simple linear interpolation along one dimension.

Some general notes with respect to the above discussion:

1. Within each of these iterations the generic Interpolation formula to be used is $$f_{abc} = \frac{d[(x[r], y[s], z[t]), (x[a], y[b], z[c])]}{d[(x[r], y[s], z[t]), (x[u], y[v], z[w])]} \cdot f_{uvw} + \frac{d[(x[u], y[v], z[w]), (x[a], y[b], z[c])]}{d[(x[r], y[s], z[t]), (x[u], y[v], z[w])]} \cdot f_{rst}$$

Where (x[r], y[s], z[t]) and (x[u], y[v], z[w]) are the given "end-points" of the interpolation and $f_{rst}$ and $f_{uvw}$ are their respective prices (costs or other value), and (x[a], y[b], z[c]) is the point of interest [that is, the point(s) whose price(s) we are interpolating at each iteration].

2. The distance function, specified as:

$$d[(x[e], y[f], z[g]), (x[h], y[i], z[j])] = \sqrt{(x[e]-x[h])^2 + (y[f]-y[i])^2 + (z[g]-z[j])^2}$$

is the Euclidean distance between the two points that are prescribed as arguments to the distance function.

3. With less than three interpolate dimensions to a price (cost or other) model, we make the following observations with respect to scenarios of less than 3 interpolate dimensions:
   a) Two Interpolate dimensions: Step 3 of the above algorithm simply reduces to Iterations 2 and 3.
   b) One Interpolate dimension: Step 3 of the above algorithm simply reduces to Iteration 3.

If implemented as a "Do Until" or "Repeat Until" (iterative) loop, this aspect does not require to be specially addressed—the implementation will adapt itself to the number of interpolate dimensions automatically.

For competitor net price modeling, global dimensions are defined for a specific target pricing bid by allowing discounts to be applied to competitor list prices across any defined global dimension. The discounts are used to arrive at net prices. The competitor list prices are maintained in the product model.

The BAU Price and Competitor Net Price models have one additional attribute besides the dimension names and dimension type ("look-up" or "interpolate") already discussed above with respect to the cost and price models. This additional attribute has been labeled "Model Type". The various values that "Model Type" takes on depend on whether the template is describing the BAU Price or the Competitor Net Price Model. For each these have been detailed below:

BAU Price
1. Discount off List Price
2. Cost Plus
3. Going Rate

Competitor Net Price
1. Discount off List Price

The obvious overlap between the BAU Price and Competitor Net Price model suggest that we should discuss the algorithms in the context of the three distinct Model Types.

Data capture for these models is exactly the same as the Price & Cost model data capture. All data necessary for computing the BAU price and Competitor Net Price is captured at the point of product-order entry. The Sales Representative GUI screens have been designed with this requirement in mind.

Reflection on the three Model Types reveals that each of them have the following two properties:
1. Each is generated or computed off a "Base Value".
   a. Discount Off List Price uses the "List Price" as the "Base Value"
   b. Cost Plus pricing uses "Cost" as the "Base Value"
   c. Going Rate pricing uses the average, minimum or maximum "Competitor Net Price" as the "Base Value". This last model has another layer of this logic/reasoning built into it, since the Competitor Net Price itself uses the "Competitor's List Price" as the "Base Value".

2. Each applies an "Adjustment Factor" to the "Base Value" to derive an "Adjusted Value"
   a. Discount Off List Price uses the "discount on list price" prescribed as the "adjustment factor"
   b. Cost Plus pricing uses the "percentage over cost" prescribed as the "adjustment factor"
   c. Going Rate pricing uses a prescribed "offset on the competitor's net price" as the "adjustment factor". As mentioned before the "competitor net price" itself involves a further level of this logic/reasoning and in fact uses a "discount off (competitor's) list price" as the "adjustment factor".

With this understanding the algorithm specification simplifies to the following:

Step 1: Compute the "Base Value"
In computing the "Base Value" the multi-dimensional linear interpolation algorithm specified above may have to be used if the "Base Value" has at least one "interpolate dimension".

Step 2: Compute the "Adjustment Factor"
Since the "adjustment factors" are described through a model similar to the Price and Cost model (i.e. multi-dimensional tables, with the ability to interpret each dimension as "Look-Up" or "Interpolate"), the algorithm above would apply here as well.

Step 3: Compute the "Adjusted Value"
The "Adjusted Value" is either
1. Discounted Price off the List Price
2. Price over the Cost
3. Offset over the Competitor Net Price
It is computed easily as follows:

AdjustedValue=(1+AdjustmentFactor)·BaseValue where it is understood that "Adjustment Factor" is represented as a "percentage" (either positive or negative). This implies that if the Adjustment Factor is 5%, then the value it assumes in the above formula is 0.05. In other words, AdjustmentFactor=AdjustmentFactorAsPercentage/100

The exact formulation for each case is as follows:
1. Discounted List Price
   DiscountedListPrice=(1+DiscountOffListPrice)·List Price
2. Cost Plus Price
   CostPlusPrice=(1+CostPlusOffset)·Cost
3. Going Rate Price
Going Rate Pricing is further classified as follows:
Case Average:

$$GoingRate = (1 + CNPOffset) \cdot \left( \sum_{i=1}^{n} CompetitorNetPrice_i / n \right)$$

Where n is the number of Competitors
Case Minimum:
   GoingRate=(1+CNPOffset)·(min {CompetitorNetPrice$_i$})
Case Maximum:
   GoingRate=(1+CNPOffset)·(max {CompetitorNetPrice$_i$})

For each case above the Competitor Net Prices are computed as follows:

CompetitorNetPrice$_i$=(1+DiscountOfCompetitorList-Price$_i$)·CompetitorListPrice$_i$ For benefits modeling, global dimensions are used to compute the target pricing benefits. Benefits are modeled by simulating the difference between target prices and their corresponding expected contribution versus prices as determined before usage of the target pricing method and their corresponding expected contribution level. Prices determined before the usage of target pricing can be modeled using global dimensions.

The market response model (MRM) performs three key functions: updating the coefficients for market response predictors on the basis of historical data (these updated values can be rejected or altered by the user); for a particular bid, evaluating the price-independent predictors to generate a market response curve that depends only on price; and for a particular bid and offered price, calculating the estimated probability of winning ("the market response").

Figure 3:
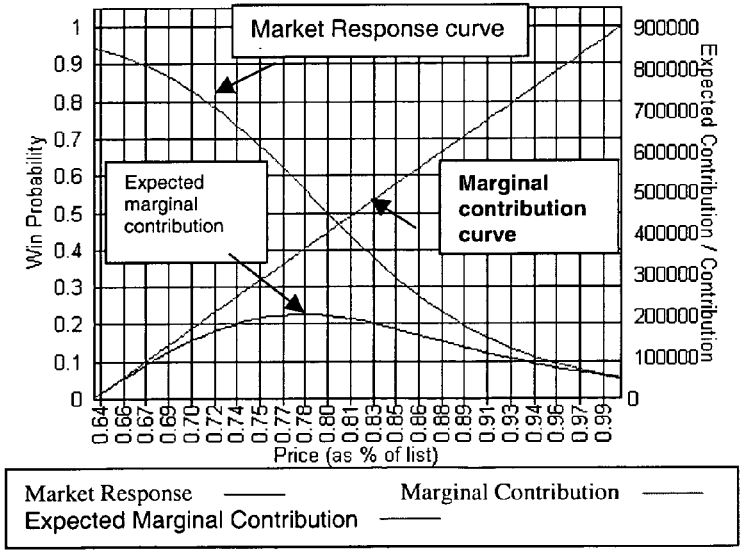
FIG. 3 is a graph illustrating the market response curve for use in the market response model and plots of contribution and expected contribution.

Predictors can be market segmentation criteria (as defined by the user), bid drivers, or a product of several of these. For every predictor specified by the user, the coefficient values that define the market response curve are estimated and stored. These coefficients are used in combination with account and bid characteristics to calculate win probabilities. The market response curve and win probabilities are illustrated in the graph of FIG. 3.

Coefficients fall into two categories: price-dependent and price independent. When computing the optimal (target) price, price-independent terms can be viewed as constants and computed in advance. The main inputs are: market segments and price-dependent and price-independent predictors for each market segment. The main outputs are: price-independent and price-dependent coefficients; bid-specific market response curves; and bid- and price-specific win probability estimates.

Bid characteristics are determined by the target pricing user prior to begining the steps of the method. The specific value used in a particular regression is based on the interpretation for the characteristics. Once the market segmentation and bid characteristics have been defined, price-independent and price-dependent have to be made so that these characteristics can be used in probability determination. Since these parameters are used for modeling customer behavior, some of the transformations may not be very intuitive at the outset. For example, logarithmic expressions have been used extensively to dampen the possibility of large swings in probability due to large changes in any one parameter.

| Bid Characteristics | |
| --- | --- |
| Characteristic Name | Description |
| Bid volume | Quantity ordered for a given portfolio. |
| Bid Gross Revenue | List price * quantity for all products in the portfolio |
| Bid Contribution | Contribution = (revenue − cost) * quantity for all the products in a given bid. |
| Key competitor | For a pre-specified set of key competitors, define if any of the competitors exist for the given bid. |
| Key product | Product with greatest revenue in bid. |

Figure 4A:
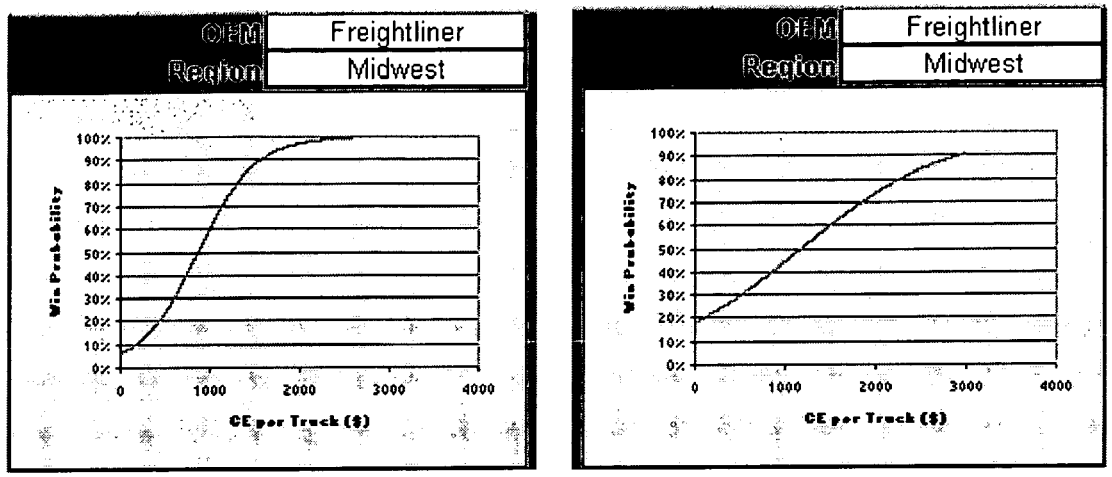
FIG. 4A is a bifurcated graph illustrating the win probability curves for a large and small volume customer for volume-based segmentation where discount is plotted on the x or price-axis.

The curves in FIG. 4A represent the probability of winning as a function of increasing discounts. These curves are reversed in shape since they model the probability of winning against discounts (CE) offered instead of the probability of winning against price.

FIG. 4A illustrates a case where both brand preference and price sensitivity differs between customers with "large" and "small" order volumes. Note that the large volume customers show less preference for our brand (lateral shift of the market response curve) and greater price sensitivity (the curve is steeper in its central region).

Figure 4B:
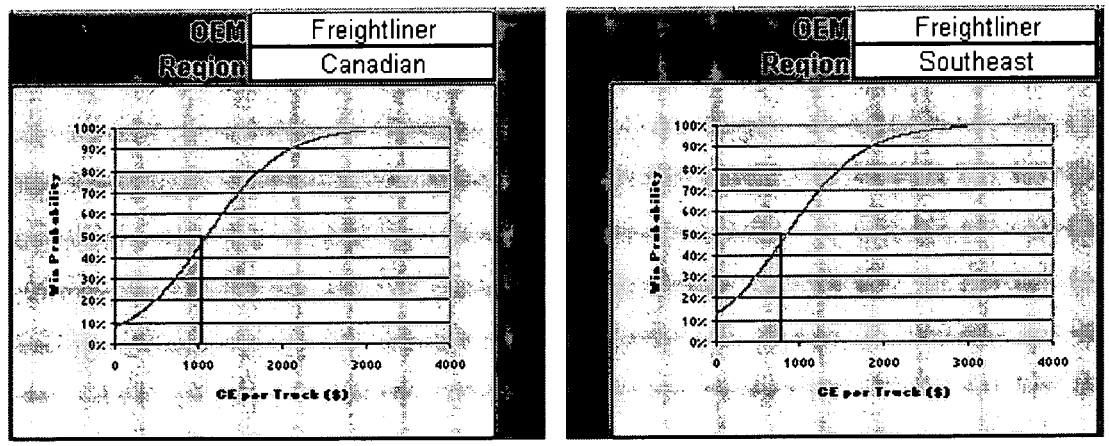
FIG. 4B is a bifurcated graph illustrating the win probability curves for a large and small volume customer for region-based segmentation.

FIG. 4B illustrates an example of regional segmentation. Since the second curve is shifted a little to the right, there is more brand preference in the Southeast region when compared to the Canadian region. While the curves are quite similar, there are differences, especially for smaller discounts.

The MRM uses historical bids containing win/loss information to run a statistical regression. The statistical regression uses the logit function to determine the best fitting market response curve. There are significant advantages of using the statistical form.

The statistical form ensures that the output is between zero and one for any set of characteristics. Further, It provides a smooth negative slope. This makes it easy to get price sensitivity from the first derivative. Mathematical properties of the logit function offer efficient numerical computation and an intuitive interpretation of the fitted coefficients.

For example, if price is the only explanatory variable for modeling the likelihood of winning, one would have 10 historical bids containing win loss information as given below:

| Price | Win/loss |
| --- | --- |
| 1 | Win |
| 2 | Win |
| 3 | Win |
| 4 | Win |
| 5 | Win |
| 6 | Loss |
| 7 | Loss |
| 8 | Loss |
| 9 | Loss |
| 10 | Loss |

Figure 5A:
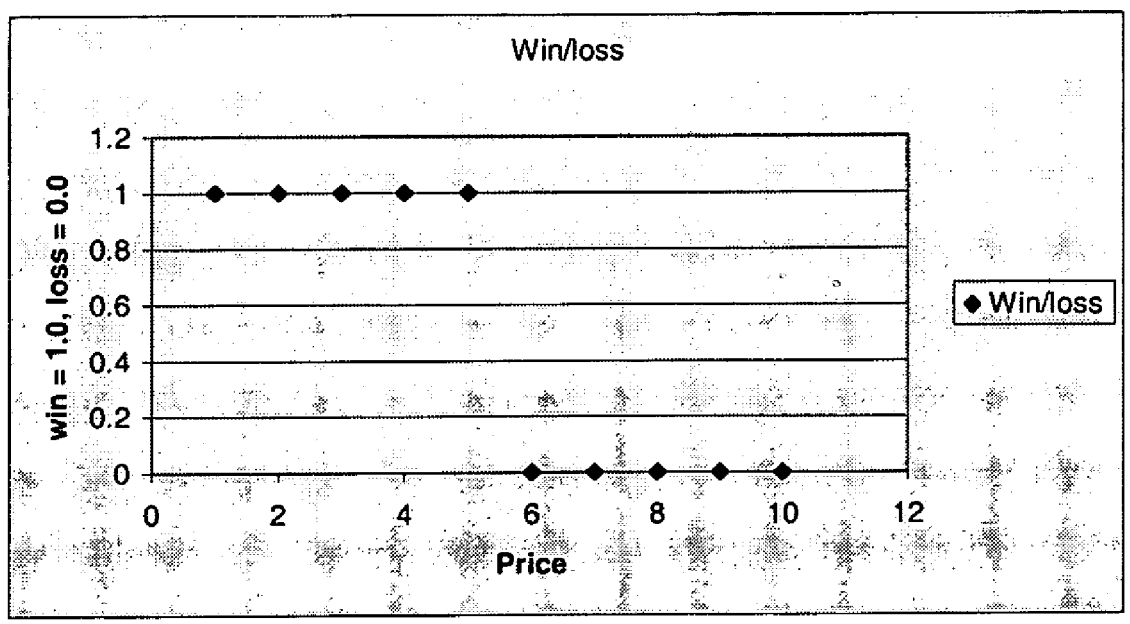
FIG. 5A illustrates a graph denoting wins and losses with baseline points plotted.

If win/loss is treated as a dummy variable where a win is identified by 1 and a loss is identified by 0, we get the plot of win/loss against price as illustrated by FIG. 5A.

If we fit this plot to a statistical function, where the statistical function is defined as:

$$p(x) = \frac{1}{1 + e^{-(\alpha + \beta x)}}$$

Figure 5B:
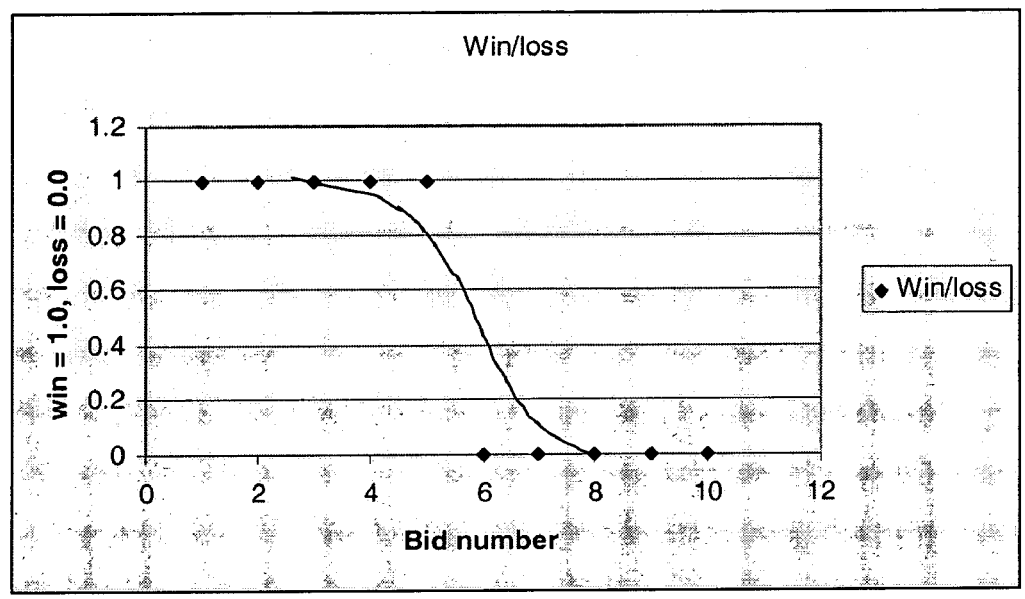
FIG. 5B illustrates the graph of FIG. 3A with a win/loss curve plotted by a statistical function.
Figure 6:
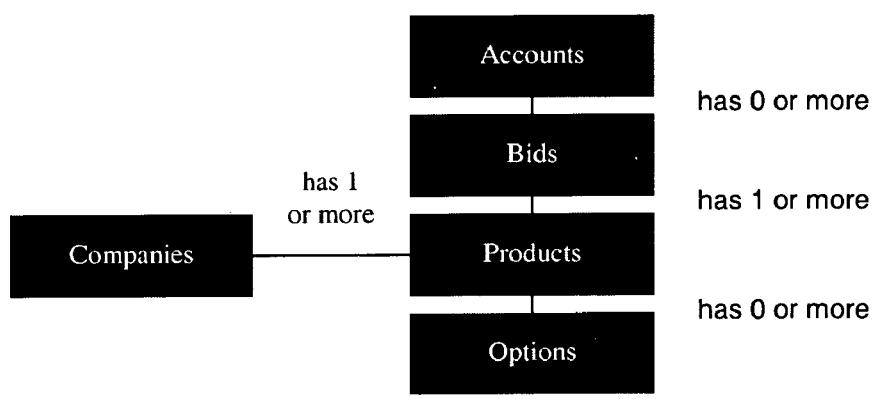
FIG. 6 is a block diagram illustrating the key objects of the target pricing system and method.

One obtains the curve of FIG. 5B, where win/loss is a binary response variable, and alpha and gamma are the explanatory variables. With this curve it is easy to determine the probability of winning at any price. A simple example is given below to illustrate MRM calculations.

An Example: Meritor Heavy Vehicle Systems

Meritor manufactures different parts for truck drive trains. These parts are sold to the end customers through OEM's (like Volvo/GM) that manufacture trucks. Since most of the trucks are assembled by OEM's for end customers, Meritor has to figure out the discounts to offer end customers.

In the example below, a bid is tendered to the Trinity Steel account by Meritor Heavy Vehicle systems. The following customer segments are defined by the user of target pricing:

INPUTS

Market Segmentation

| Market Segment Name | Customer Size |
|---|---|
| Market Segment Interpretation | Small: 0 to 100, Medium: 101 to 500, Large 501 and greater |

The following bid characteristics are further defined by the user:

| Bid Characteristic | |
|---|---|
| Characteristic Name | LOGVOL |
| Characteristic Interpretation | Log of quantity ordered |

Accordingly, given below is a sample bid tendered to the account Trinity Steel:

| Sample Bid | |
|---|---|
| Account No. | 1 |
| Account | Trinity Steel |
| Customer Size * | Medium |
| Bid No. | 1 |
| Product Ordered | Transmission - TR1234 |
| Quantity Ordered | 100 |
| Win/Loss | Win |
| Our Net Price | $55 |
| Competitor Net Price | $57 |

The market response variables are thus calculated:

| Problem Formulation Variable | Formula for Conversion | Value Used |
|---|---|---|
| Alpha | | |
| Alpha 0 (Intercept) | Intercept variable set to 1 for every problem | 1 |
| Alpha 1 (Discrete Cust. Seg. - Dummy var.) | Small = 0.0, Medium = 1.0, Large = 2.0 | 1 |
| Alpha 2 (LOGVOL) | Log (quantity) | 2 |
| Gamma | | |
| Gamma 1 (Discrete Cust. Seg. - Dummy var.) | Alpha 1 * Log (PriceRatio) | -0.015512166 |
| Gamma 2 (LOGVOL) | Alpha 2 * Log (PriceRatio) | -0.031024332 |

Multiple rows of similar bids containing win/loss information are calculated in a statistical regression routine, as shown below:

| OUTPUTS | |
|---|---|
| Coefficients Obtained By Regression | |
| Alpha | |
| Alpha 0 (Intercept) | -0.003 |
| Alpha 1 (Discrete Cust. Seg. - Dummy var.) | -0.001 |
| Alpha 2 (LOGVOL) | -0.0006 |
| Gamma | |
| Gamma 1 (Discrete Cust. Seg. - Dummy var.) | -0.0008 |
| Gamma 2 (LOGVOL) | -0.0003 |

Given these coefficients, the win probability of any bid can easily be calculated for a specific price. For the example above we have:

| Calculating Probability of Winning | | |
|---|---|---|
| Sum of Alphas = | Alpha 0 + Alpha 1 + Alpha2 | -0.0046 |
| Sum of Gammas = | (Gamma1 + Gamma2) * (log(PriceRatio)) | 1.70634E-05 |
| Prob of winning for the bid above | 1/1+EXP-(Alphas + Gammas*log(PriceRatio)) | 0.499 |

The win probabilities can accordingly be determined from the active parameter set that contains the market response parameter used by the system to compute win probabilities.

The binomial case for win probability is:

$$\text{Win Prob} = \frac{1}{1 + \exp(\alpha + \gamma)}$$

Where $\alpha = \alpha_0 + B_1\alpha_1 + B_2\alpha_2 + \ldots + B_n\alpha_n$ and where $\gamma = \gamma_0 + D_1\gamma_1 + D_2\gamma_2 + \ldots + D_n\gamma_n$ The multinomial case for win probability is:

$$\text{Win Prob} = \frac{1}{1 + \sum_i \exp(\alpha_1 + \gamma_i)}$$

Where $\alpha_i = \alpha_0 + B_{1i}\alpha_1 + B_{2i}\alpha_2 + \ldots + B_{ni}\alpha_n$ and where $\gamma_i = \gamma_{0i} + D_1\gamma_{1i} + D_2\gamma_{2i} + \ldots + D_n\gamma_{ni}$ In each case, the $\alpha$'s and $\gamma$'s are specific to a bid.

$B_1, \ldots B_n$ are bid specific brand preference and other price independent drivers and market segment variables.

$D_i, \ldots D_n$ are bid specific price dependent drivers and market segment variables.

The $\alpha$'s are referred to as brand preference and other price independent parameters because a change in these parameters shifts the Market Response curve to the right (or to the left).

The $\gamma$'s are referred to as price dependent parameters because a change in these parameters changes the slope of the Market Response curve.

Figure 8:
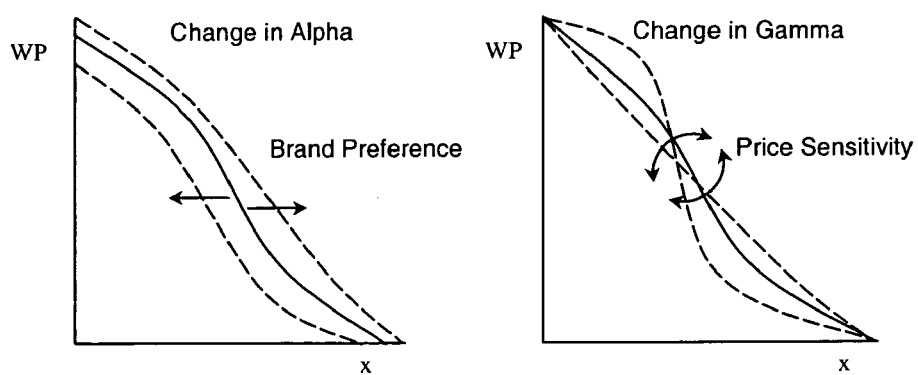
FIG. 8 illustrates the impact of the predictor coefficients on the market response curve.

The price-independent predictors can be viewed as measures of customers' brand preferences. The price-dependent ones, however, provide a measure of customers' price-sensitivity, and determine the slope of the linear region of the market response curve. FIG. 8 illustrates the impact of the predictor coefficients on the market response curve.

With respect to the preferred method of statistical regression:

$$\frac{\text{Win}}{\text{Probability}} = \frac{1}{1 + \exp[-\alpha - \gamma \times \text{price}]}$$

$\alpha$ represents the sum of price-independent coefficients. Note that in FIG. 8, as $\alpha$ increases, the curve shifts right (signifying increased brand preference). $\gamma$, on the other hand, sums the effects of a change in price. Hence, in FIG. 8, as $\gamma$ increases, the curve becomes steeper.

For the statistical market response curve, there is always an inflection point where the win probability (WP) equals 0.5. The higher $\gamma$, the steeper the curve near WP=0.5, and the shallower at the endpoints WP=0 and WP=1.

It should be noted that market segmentation models macro level customer behavior (e.g. region based market segments), and is therefore an integral part of pricing strategy. In target pricing, account characteristics can be used to identify market segments, enabling segment-specific net prices to be offered. In addition, characteristics of individuals bids (such as volume or key competitor) can further influence customers' brand preference and willingness to pay. The MRM therefore applies the characteristics of both the account and the particular bid when estimating bid probabilities.

There are basic business objects that enable target pricing to be deployed in multiple diverse industries and serve as its basic infrastructure for bidding. In particular, key objects include: companies, accounts, bids, products, and options (including competing products and options).

"Companies": a company is either the target pricing user or one of the companies competitors.

"Accounts": these are customers or potential customers of the target pricing user.

"Bids": a bid is a request for products over a specified time period for which a custom price will be generated by the target pricing method.

"Products": these are the products or services that the target pricing user produces and includes in a bid. In addition, products also include those produced by competitors.

"Options": these are auxiliary sub-products that can be added to a product, but which cannot be ordered on their own.

FIG. 4 illustrates how the key objects are inter-related. Companies produce the products that are contained in account bids. Accounts are the current and potential customers of the target pricing user. Each account is identified by a name and an account number. Associated with each account are values of the market segment variables.

An account contains 0 or more bids. An account will contain 0 bids if it is new or if no bids have been created for it to date. Although an account can contain more than 1 bid, only 1 bid may be active at any time. The remaining bids will either be inactive, rejected, pending or under construction.

An example of the active bidding:

| Account Number | Name | HQ Address | Customer Since | Customer Segment | Industry |
|---|---|---|---|---|---|
| 1 | Talus | Mt. View, CA | Jan. 1, 1990 | Small | 541 |
| 2 | Cisco | Menlo Park, CA | Jan. 1, 1985 | Large | 334 |
| 3 | Hertz | Park Ridge, NJ | Jan. 1, 1998 | Medium | 485 |
| 4 | Hyatt | Oakbrook, IL | Null | Null | 721 |
| 5 | Safeway | Oakland, CA | Null | Null | 445 |

A bid is a proposal to an account for delivery of products over a specified time period at a specified price. The bid contains at least one, and may contain more than one, product or service order. For example, a bid can contain the following information as illustrated below: bid number, account, bid description, bid status, account executive, various dates, and one or more product orders.

| Bid Number | Account | Description | Dates | Status |
|---|---|---|---|---|
| 1 | Talus | Annual Renewal | 1997 | Inactive |
| 2 | Talus | Annual Renewal | 1998 | Active |
| 3 | Cisco | Annual Renewal | 1997 | Inactive |
| 4 | Cisco | Annual Renewal | 1998 | Active |
| 5 | Hertz | Initial Proposal | 1998 | Active |
| 6 | Hyatt | Initial Proposal | 1997 | Rejected |
| 7 | Safeway | Initial Proposal | 1998 | Rejected |

A bid is always in one of the following states (note that the state can change over time):

"Under construction"—The bid is being prepared, and has not been submitted to the customer.

"Pending"—The bid has been completed, target priced, and submitted to the customer, but no response has been obtained from the customer yet.

"Active"—A bid has been accepted, and converted to a contract, under which we are now offering products.

"Rejected"—A bid has been rejected outright or has expired unexercised.

"Inactive"—A bid that was previously active, but has run through the specified (active) time period.

A bid has associated with it the following dates:

"Start date"—Initial date for which products will be provided under these terms.

"End date"—Final date when products will be provided under these terms.

Some embodiments do not associate a "Start date" and "End date" with a bid.

"Initiation date"—Date when bid was initially submitted to the customer.

"Close date"—Date when a bid was either accepted, rejected or expired unexercised.

"Expiration date"—Date when a bid expires.

"Last modified date"—Date when the bid was last modified (either the product order was modified or the offered price was changed).

Products are the goods and services that a company provides to its customers at contracted or agreed terms. Products can consist of the following parameters: Name, number, part number, product line, set of options, cost model, price model, set of competing products, and company.

In the object model, it is preferable to differentiate between products and product orders. Products are the definition, and product orders are specific products that have been ordered in a bid. Product orders contain quantity, corresponding time period, and options. Some examples of products:

| Number | Name | Product Line | Part Number |
|---|---|---|---|
| 1 | Inspiron 3500 D266Xt | Notebooks | 1001 |
| 2 | Dimension XPS R450 | Business Desktops | 2001 |
| 3 | Solo Portable PC | | 5150 |
| 4 | Hyperspace GX-450XL | | 6200 |

Product orders are the specific products and options that have been ordered in a bid. The product order also specifies the quantity being requested and the time period that quantity relates to (e.g., per day, per week, per month, per quarter, per total). In addition, the product order specifies the options that have been ordered with this product. Finally, for any products which contain N dimensional price or cost models, the specific dimensions corresponding to the price/cost model must also be recorded. An example of this is:

| Product Number | Quantity | Period | Competitor | Comp Net Price | Options |
|---|---|---|---|---|---|
| 1 | 25 | Total | 1 | 2700 | None |
| 2 | 50 | Total | 1 | 3999 | 2 |

Options are sub-products that can be ordered for a specific product. An option can only be ordered after the corresponding product has been ordered. Each product contains 0 or more options.

Options can consist of the following parameters: name, cost model, price model, competing options, and company.

In the object model, it is preferrable to differentiate between options and option orders. Options are the definition, and option orders are the specific options ordered along with a particular product order. Option orders are contained in the product orders object, as the following example illustrates.

| Number | Name | Company | Price Model | Cost Model | Competing Option |
|---|---|---|---|---|---|
| 1 | 32MB memory | 0 | $99 | $50 | 3 |
| 2 | 3 yr. warranty | 0 | $150 | $50 | 4 |
| 3 | 32MB memory | 1 | $60 | | |
| 4 | 3 yr. warranty | 1 | $0 | | |

Prices and costs can be modeled in the following ways:

| 0 - D | A single value |
|---|---|
| 1 - D | A vector of values |
| 2 - D | A two-dimensional matrix |
| N - D | An n-dimensional matrix |
| Function | A combination of the above models |

Example Price/Cost Models

| 0 - D | $20 | | | |
|---|---|---|---|---|
| 1 - D | Quantity | 1 | 2–5 | 6+ |
| | Price | $20 | $18 | $15 |
| | | Weight | | |
| 2 - D | Distance | 0–1 lbs. | 1–10 lbs. | 10+ lbs. |
| | 1 Zone | $10 | $8 | $5 |
| | 2 Zones | $15 | $12 | $8 |
| | 3 Zones | $19 | $14 | $9 |

"Function": Pickup cost (0-D)+Transportation cost (2-D) Prices or costs can be retrieved from the tables from matching entries and interpolated for exact price.

For each of the target pricing user's products, a list of competing products is specified. Each of these competing products are to be treated like the target pricing user products. The only differences are that the company specified in the product is a competitor, and no cost model is specified since we do not need to compute costs for competitors.

The competitor net price (CNP) model used in target pricing estimates the prices competitors will offer to customers, including negotiated discounts. Logically, with all other factors being equal, the lower the competitor net price, the lower the target bid price will have to be to ensure the same probability of success. Conversely, the higher the competitor net price is, the more latitude one will have in generating a target bid price.

The target pricing method ideally uses accurate competitor net prices at the product level for every product in the specific bid. The target pricing method can then calculate a competitor net price for each competing product. While the competitor net prices can be estimated, the variance in the data can cause the target price obtained to not properly reflect the current market environment.

For each of the target pricing user's products, there is typically a competing product from each competitor in the system. For example, if the target pricing user were Ford, and the competitors consisted of Honda and Toyota, then for each Ford product, such as the Taurus automobile, there would be a competing product from Honda (for example, the Accord automobile) and a competing product from Toyota (for example, the Camry automobile). A competing product is only required at the order level.

These competing products are maintained in the target pricing product model much like the target pricing user's products, with the following exceptions: no cost model is stored for them, since it is not necessary to estimate the cost of a competitor's offering. Competing products are not maintained, as these are stored in the target pricing user's product table.

To compute a competing product's list price, the price model maintained in that product is utilized. Like all other products, the competitor's product price can be maintained as a 0-D, 1-D or 2-D model. All of the attributes needed for price modeling (i.e., the dimensions of the price model) must be obtained during the bid product order construction process.

To the product's list price we must also add the price of the options. This is done by examining the user product model and retrieving the appropriate option prices. This process can best be clarified by the following example:

| Continuous Market Segments | Annual Revenue |
|---|---|
| Small | $0 to 50M |
| Medium | $51M to $400M |
| Large | $400M and over |

Target Pricing User: Ford
Competitors: Honda and Toyota
Product: Taurus
With the following 1-D price model:

| Taurus Price Model | |
|---|---|
| Quantity | Price |
| 1–9 | $20,000 |
| 10–99 | $19,000 |
| 100+ | $18,000 |

Taurus Competitors table:
Honda: Accord
Toyota: Camry
Taurus Options table:

| Option | Price | Honda option/price | Toyota option/price |
|---|---|---|---|
| Sunroof | $1000 | Moonroof - $800 | n/a |
| V-8 | $2000 | V-6 - $1500 | V-6 - $2000 |
| Leather seats | $800 | LX upgrade - $1200 | XLE upgrade - $2000 |

Product: Honda Accord
With the following 1-D price model:

| Honda Accord Price Model | |
|---|---|
| Quantity | Price |
| 1–5 | $22,000 |
| 6+ | $20,000 |

Product: Toyota Camry
With the following 0-D price model: $21,000

Example Bids:

Bid #1:
  1 Ford Taurus, with Sunroof and V-8
  Ford list price=$20,000+$1000+$2000=$23,000
  Honda list price=$22,000+$800+$1500=$24,300
  Toyota list price=$21,000+0+$2000=$23,000

Bid #2:
  15 Ford Taurus with Sunroof and Leather seats
  Ford list price=$19,000+$1000+$800=$20,800
  Honda list price=$20,000+$800+$1200=$22,000
  Toyota list price=$21,000+0+$2000=$23,000

After computing the competitor list price, the net price is computed by applying the appropriate discounting model. The discounting options are as follows (note that each model varies by competitor):

no segmentation used=a single discount value is applied against all products;
  product segmentation used=a different discount is available for each product; market segmentation used=a different discount is available for each market segment; or
  combination of segments=combine more than one market segment, or the product segment with one or more market segments.

As before, this is best illustrated by example:
Honda: No segmentation used: Standard discount is 10%.
Toyota: Product and market segments are used as follows:

| | Market segment = Customer size | | |
|---|---|---|---|
| Product | Small | Medium | Large |
| Corolla | 0% | 5% | 10% |
| Camry | 0% | 10% | 15% |

This indicates that to compute the net price for Honda, we first compute the list price (including options) and then discount by 10%. To determine the net price for Toyota, we first need to determine what Customer size market segment the account falls into, and then apply the appropriate percentage against the product being priced. For example, for a Medium size customer purchasing the Camry, the discount would be 10%.

Because the competitor net price is a very important input for the target pricing method, precautions should be taken to ensure that the estimated competitor net price is reasonable. This is preferably accomplished by using an allowable range.

The allowable range is used to determine values that fall outside the allowable range during the target bid price calculation. If the value is outside the allowable range, the competitor net price must be changed until it falls within the allowable range, or the competitor net price model must be changed.

The target pricing method can be optimized for a particular user. At a macro level, the target pricing method recommends a target price for each bid. These bid level recommendations are then used to calculate product level price recommendations. The target prices at each level are determined by a non-linear optimization that maximizes expected marginal contribution subject to certain business rules (constraints). However, rather than providing a single specific bid price, the target pricing method preferably computes a range within which one can negotiate a final price with the customer.

One can either considers a "static" evaluation of bids, or at the macro level, capture market place dynamics by evaluating each bid order over multiple years. The multi-year optimization can model behavior like competitor response, changes in interest rates, changes in cost and price structures, and like parameters.

Target pricing computes prices in a sequence of four steps:
(1) Unconstrained bid-level prices.
(2) Constrained bid-level prices.
(3) Unconstrained product-level prices.
(4) Constrained product-level prices.

At each step, the method calculates a minimum price, target and maximum price. Internally, prices are computed as percentage discounts relative to list price, but the target pricing user can choose to display them as absolute (cash) amounts, absolute (cash) discounts, or price ratios relative to a competitor net price.

The target pricing user must gather all bid and account information necessary to calculate win probabilities. Examples of additional parameters or factors are: products, options and quantity ordered; list price and quantity for all products in the bid; cost and quantity for all products in the bid; competitor's net price for all products in the bid.

The target pricing method generates minimum, target and maximum prices as its output. The values produced are unconstrained and constrained prices for the entire bid, and unconstrained and constrained prices for each product.

The method of optimization particularly includes the steps of: solving the unconstrained bid level optimization, ignoring all strategic objectives; then solving the strategic objectives through application of the constrained optimization; and then solving the unconstrained product optimization and the constrained product optimization.

In using the method, the MRM is used to analyze historical bid data and update the coefficients for the market response predictors with all account and bid characteristics. The MRM calculates all price-independent terms to generate a market response curve dependent only on the target pricing user's net price. Then, the user preferably performs a non-linear optimization routine to find the price which maximizes expected contribution:

expected contribution=win probability×sum over all products [list price×(1−discount)−variable cost of product $i$]×quantity of product $i$ Once bid optimization has been calculated, discounts are assigned for each product in the bid. While it is possible to simply assign discounts calculated at the bid level to each of the products within the bid, it is preferable to optimize the allocation to each product.

The method should maximize expected contribution (at the bid level) while allocating incentives for each of the products ordered in a given bid. Individual product incentives are aggregated to the bid level and are subject to any desired constraints. The incentives offered at the product level should aggregate to the bid level incentive determined by the bid optimization. And product incentives should not exceed the available margin on that product although a negative margin could be enabled in some embodiments.

Strategic objectives can be used to control the default behavior from usage of the target pricing method. Furthermore, strategic objectives determine constraints that impact the calculation of the optimal target price.

The method preferably uses 2 types of strategic objectives:

"Win (success) rates"—these are minimum or maximum bid win rates needed in particular market segments.

"Minimum profit margins"—these are minimum profit margins that are enforced with each bid.

The strategic overrides are preferably applied in the following sequence: (1) the unconstrained target price is calculated; and (2) conflicting strategic objectives are resolved. A feasible target range is calculated from the constraints determined by the strategic objectives. If the optimal target price is outside this feasible range, the constrained target price that satisfies the constraints is found.

Among multiple minimum success rate objectives, choose the one with the highest success rate. Among multiple maximum success rate objectives, choose the one with the lowest success rate. Among multiple profit margin objectives, choose the one with the highest profit margin. If a success rate objective and a profit margin objective are in conflict, an arbitrary parameter set by the user determines precedence.

Minimum profit margins can be applied at 2 levels: at the individual product level and at the product-line level. After the unconstrained target price has been calculated, the products minimum profit margins are verified. If for any product, the minimum profit margin is being violated (for example, minimum profit on Product A is 10%, but method has calculated 8%), the target price should then be adjusted up to the minimum profit margin (that is, the price is increased until the minimum profit margin criteria is satisfied).

After all product margins have been adjusted, the overall bid margin is calculated. If the bid margin exceeds the minimum, then prices for all products should be adjusted proportionately. For example, assume that the minimum bid profit margin is 10% and we have a bid with a 5% margin. Then the price for each product in the bid will be increased proportionately until the overall bid margin is 10%.

The total cost of all strategic objectives for a particular bid is calculated, and alternately, will determine the costs of applying strategic objectives for an entire set of potential bids, on a forward-looking basis. The expected cost of the strategic objectives on a particular bid is simply the difference between the expected contribution without the strategic objectives and the expected contribution with the objectives.

The benefits of the target pricing can be used to gauge the performance of use of target pricing, and also to focus investigative efforts in areas where the target pricing user's previous system does not appear to be operating effectively. The problems may be a result of user error, for example, incorrect input data, and thus should be rectified as soon as possible.

The benefit of target pricing is defined as increased expected contribution from using the target pricing. Mathematically this is expressed as: the expected contribution with target pricing less the expected contribution from using the company's pre-existing pricing method.

The preferred methodology to compute target pricing benefits is gathering a database of historical bid transactions, and for each bid, recording the following information:

"Target price": as calculated by the system through its optimization process,

"Actual price": as determined through ultimate purchase by the client (should normally fall inside the range computed by the target pricing method), "Variable costs": which are unique to each bid circumstance, "TP win prob": the win probability associated with the target price, "AP win prob": the win probability associated with the Actual Price, using the same market response curve as for the TP win prob, "Business-as-usual (BAU) price": the price which would have been used for the bid prior to target pricing, and "BAU win prob.": the win probability associated with the BAU price, using the same market response curve as for the TP win prob.

Using the above values, we can calculate:
Actual received benefits (i.e., the benefits that the user is currently experiencing)=(Actual price−cost)*AP win prob.−(BAU price−cost)*BAU win prob.; and
TP optimal benefits (i.e., the theoretical system potential if used correctly)=(Target price−cost)*TP win prob.−(BAU price−cost)*BAU win prob.

These numbers can be calculated for each transaction, and then the benefits numbers scaled to whatever level is desired.

For example, the benefits could be aggregated by: competitor, region, account executive, customer type, industry segment, or other parameters.

In order to calculate the target pricing benefits, simulation of the pricing behavior of the company before target pricing is necessary. The user preferably selects from among three different pricing methods:

"Cost-plus pricing": The price is a pre-specified amount (the profit margin) over cost. BAU price=Cost*(1+Gross Margin)

"List pricing": The price is discounted a pre-specified amount from that maintained in the price list. BAU price=List Price*(1−Discount)

"Going-rate pricing": The price is based on competitors' prices, and is a pre-specified amount over or under their price. BAU price=Competitor Net Price*(1+Gross Margin)

Each of these BAU price models can vary by product, or according to any of the system's global dimensions. For the going-rate model, the target pricing user must choose how to calculate a "going rate" from multiple competitors' prices: options are the minimum, average or maximum of the competitors' net prices.

A few examples will make the pre-target pricing practices model clearer:

A company always priced at 10% above cost. This is a cost-plus model with no segmentation. Margin=10%. A company always priced at something above cost. For certain highly competitive products it was 5%, for the remaining proprietary products it was 20%. This is a cost-plus model with product segmentation. A company priced at something above cost. The margin varied by product and customer size. Cost-plus with product and market segmentation. A company discounted from its standard price list. The discounts varied by region and customer size. List pricing with two global dimensions (region and customer size).

A company priced based on its competitors. Against Competitor A, the company priced 5% above, against Competitor B, the company priced 5% below. Going rate pricing.

The final step in the target pricing benefit computation is to take the BAU price calculated using one of the above methods, and calculate the associated win probability. This is done by looking up the win rate associated with that price from the market response curve (this also requires the competitor net price). Since the market response model is derived from unbiased historic information, and since it directly relates price to win probability, it can be used to compute the win probabilities for prices computed using non-target pricing methods. For comparisons to be meaningful, however, the same MRM parameters set must be used to compute both TP and BAU win probabilities.

It should be understood that the foregoing pertains only to the preferred embodiment of the present invention, and that numerous changes may be made to the embodiment described herein without departing from the spirit and scope of the invention.

What is claimed is:

1. A target pricing system used in a computer for obtaining an optimum value, the target pricing system resident on one or more host processors in connection with one or more data stores, the target pricing system comprising:

a product model that prices using a computer a plurality of values using stored price data and estimates costs for each of the values using stored cost data;

a competitor net price model that calculates using a computer an equivalent competitor net price; and a market response model that calculates using a computer the probability of winning with each of the values as a function of price, wherein the market response model uses an equation:

$$\text{probability of winning} = \frac{1}{1 + \sum_{j \in J} e^{k_j + m_j}}$$

wherein, for J competitors, $k_j$ is a sum of price-independent terms for competitor j and $m_j$ is a sum of price-dependent terms for the competitor j.

2. The system of claim 1, further including
an optimization model that computes the target price of the optimal value that maximizes expected contribution.

3. The system of claim 1, further including a benefits model that calculates one or more benefits of target pricing in comparison to a pre-existing pricing approach.

4. The system of claim 2, wherein the product model, competitor price model, market response model, optimization model, and benefits model are objects implemented in software on the one or more processors of the target pricing system.

5. A target pricing system used in a computer for obtaining an optimum value, the target pricing system resident on one or more host processors in connection with one or more data stores, the target pricing system comprising:

a product model that produces, using a computer, a plurality of bids using stored price data and estimates costs associated with each of the bids using stored cost data;

a competitor net price model that calculates using a computer an equivalent competitor net price; and a market response model that calculates using a computer the probability of winning with each of the values as a function of price;

wherein the market response model calculates the probability of winning as:

$$\text{probability of winning} = \frac{1}{1 + \sum_{j \in J} e^{k_j + m_j}}$$

wherein, for J competitors, $k_j$ is a sum of price-independent terms for competitor j and $m_j$ is a sum of price-dependent terms for the competitor j, and an optimization model that determines the competitive response to each of the bids and computes a target price that maximizes expected contribution.

6. The system of claim 5, further including using a benefits model that calculates one or more benefits of target pricing in comparison to a pre-existing pricing approach.

7. The system of claim 6, wherein the product model, competitor price model, market response model, optimization model, and benefits model are objects implemented in software on the one or more processors of the target pricing system.

8. The system of claim 5, wherein the product model and the competitor price model are n-dimensional with stored data reflective of at least price and cost, and wherein the system pricing the bid, costing the bid, and calculating an equivalent competitor net price are performed by iterative linear interpolation of the stored data.

9. The system of claim 5, wherein the market response model includes coefficients for market response predictors based upon historical data, and for a specific bid, evaluates price and price-independent predictors to generate a market response curve from which an estimated probability of winning a bid is calculated.

10. The system of claim 9, wherein the coefficients are dynamically updated over time based on results of past bids.

11. The system of claim 10, wherein the market response predictors are attributes selected from the group comprised of: customers, orders, and products.

12. The system of claim 11, wherein the customers attributes are static and variable attributes.

13. The system of claim 6, wherein the benefits model obtains the target price for the specific bid, calculates a bid price using a pre-existing pricing approach, and compares the bid from the pre-existing pricing approach to the market response curve to determine the probability of a successful bid with the pre-existing pricing approach.

14. The system of claim 13, wherein the pre-existing pricing approach is selected from the group comprised of discounting a list price in the product model; adding to the cost in the product model; and competitive matching of historical data.

15. The system of claim 5, further including strategic objectives, each of which affect the target price of the bid.

16. The system of claim 15, wherein the strategic objectives are selected from the group comprised of: a pre-specified maximum or minimum margin on the bid; and obtaining a pre-specified maximum or minimum success rate on the bid.

17. The system of claim 16, wherein the strategic objectives are specified at the product segment level and market segment level.

18. The system of claim 5, wherein the target pricing system further calculates a target range for the target price using the constraints of the strategic objective objects and determines the target price for the bid that is within the target range.

19. The system of claim 18, wherein the target range is calculated based upon a predetermined plus or minus range around the maximum expected contribution.

20. The system of claim 18, wherein the target range is calculated based upon a predetermined plus or minus range greater and lesser than the calculated optimum target price.

21. The system of claim 5, wherein the target pricing system is resident on one or more processors in a local network of a user of the target pricing system.

22. The system of claim 5, wherein the system includes a target pricing data store including at least the price data, cost data, and historical data, and additional business metrics such as margin, volumes, and revenues.

23. The system of claim 5, wherein the one or more processors of the target pricing system are remotely located from the user of the target pricing system and accessible from a remote interface across the Internet.

24. The system of claim 7, wherein the product model, competitor price model, market response model, optimization model, benefits model, and target pricing data store are resident on the one or more processors of the target pricing system located remotely from the user.

25. An automated method of target pricing a value with one or more processors in connection with one or more data stores, comprising the steps of:

pricing the value using stored list prices in a product model;

costing the value using stored costs in the product model;

calculating an equivalent competitor net price for the value using a competitor net price model;

calculating the probability of winning with the value as a function of price using parameters from a market response model; and calculating a target price for the value that maximizes expected contribution using an optimization model that determines competitive response to any potential value, wherein the step of calculating the probability of winning by:

$$\text{probability of winning} = \frac{1}{1 + \sum_{j \in J} e^{k_j + m_j}}$$

wherein, for J competitors, $k_j$ is a sum of price-independent terms for competitor j and $m_j$ is a sum of price-dependent terms for the competitor j.

26. The method of claim 25, further including the step of calculating one or more benefits of target pricing in comparison to a pre-existing pricing approach.

27. The method of claim 26, wherein the product model and the competitor price model are n-dimensional with stored data reflective of at least price and cost, and the steps of pricing the value, rusting the value, and calculating an equivalent competitor net price are located by iterative linear interpolation of the stored data.

28. The method of claim 25, wherein the step of calculating an equivalent competitor net price further includes the steps of:

retrieving a price from the product model for a specific value; and applying a discounting model to the price to determine a competitor net price for the specific value.

29. The method of claim 28, further including the step of overriding the calculated equivalent competitor net price if the calculated competitor net price falls outside a predetermined range.

30. The method of claim 25, wherein the market response model includes coefficients for market response predictors based upon historical data, and for a specific value, the step of calculating the probability of winning the bid includes the steps of:

evaluating price-independent predictors; and generating a market response curve from which an estimated probability of winning with the value is calculated.

31. The method of claim 30, wherein the step of evaluating price-independent predictors is evaluating price independent predictors for at least the customer, the order, and the product.

32. The method of claim 31, further including the step of evaluating static and variable price-independent predictors.

33. The method of claim 26, wherein the step of calculating one or more benefits of target pricing includes the steps of:

obtaining the target price for the specific value;

calculating a target price value using a pre-existing pricing approach; and comparing the value from the pre-existing pricing approach to a market response curve to determine the probability of a successful bid with the pre-existing pricing approach.

34. The method of claim 33, wherein the step of calculating a target price bid using a pre-existing pricing approach is a step selected from the group of:
discounting the list price from the price model;
adding a predetermined amount to the cost for the value; and
matching a historic rate for the specific value.

35. The method of claim 26, further comprising the steps of:
calculating a specific target price for a performance of a contract;
determining the applicability of one or more strategic objectives to the target price;
calculating a target range for the target bid price that is constrained by the one or more strategic objectives; and
obtaining a target price that is within the target range.

36. The method of claim 35, wherein the step of determining the applicability of one or more strategic objectives is a step selected from the group of:
obtaining a pre-determined maximum or minimum margin on the value; and
obtaining a pre-determined maximum or minimum success rate on the value.

37. The method of claim 25, further including the step of calculating a target range for the value.

38. The method of claim 37, wherein the step of calculating a target range is a step selected from the group of:
calculating a target range from the maximum expected contribution; and
calculating a target range based upon the optimum target price.

39. A target pricing system for obtaining an optimum value, the target pricing system resident on one or more host processors in connection with one or more data stores, the target pricing system comprising:
product model means for creating a product model that prices the value using stored price data and costs the value using stored cost data;
competitor net price model means for creating a competitor net price model that calculates an equivalent competitor net price for the value; and
market response model means for creating a market response model that calculates the probability of winning with the value as a function of price, wherein the market response model means calculates the probability of winning using an equation:

$$\text{probability of winning} = \frac{1}{1 + \sum_{j \in J} e^{k_j + m_j}}$$

wherein, for J competitors, $k_j$ is a sum of price-independent terms for competitor j and $m_j$ is a sum of price-dependent terms for the competitor j.

40. The system of claim 39, further including
an optimization model means for creating an optimization model that determines the competitive response to any potential value and computes the target price that maximizes expected contribution.

41. The system of claim 39, further including a benefits model means for creating a benefits model that calculates one or more benefits of target pricing in comparison to a pre-existing pricing approach.

42. The system of claim 41, wherein the product model means, competitor net price model means, market response model means, optimization model, and benefits model are objects implemented in software on the one or more processors of the target pricing system.

43. The system of claim 39, wherein the product model and the competitor price model are n-dimensional with stored data reflective of at least price and cost, and wherein the system pricing the value, costing the value, and calculating an equivalent competitor net price are performed by iterative linear interpolation of the stored data.

* * * * *